(12) United States Patent
Wallrabenstein et al.

(10) Patent No.: US 10,958,452 B2
(45) Date of Patent: Mar. 23, 2021

(54) SYSTEM AND DEVICE INCLUDING RECONFIGURABLE PHYSICAL UNCLONABLE FUNCTIONS AND THRESHOLD CRYPTOGRAPHY

(71) Applicant: Analog Devices, Inc., Norwood, MA (US)

(72) Inventors: John Ross Wallrabenstein, West Lafayette, IN (US); Thomas Joseph Brindisi, Key West, FL (US)

(73) Assignee: Analog Devices, Inc., Wilmington, MA (US)

( * ) Notice: Subject to any disclaimer, the term of this patent is extended or adjusted under 35 U.S.C. 154(b) by 506 days.

(21) Appl. No.: 15/615,641

(22) Filed: Jun. 6, 2017

(65) Prior Publication Data

US 2018/0351754 A1 Dec. 6, 2018

(51) Int. Cl.
*H04L 9/32* (2006.01)
*H04L 9/08* (2006.01)
*H04L 29/06* (2006.01)

(52) U.S. Cl.
CPC ............ *H04L 9/3278* (2013.01); *H04L 9/085* (2013.01); *H04L 9/3218* (2013.01); *H04L 9/3255* (2013.01); *H04L 9/3257* (2013.01); *H04L 63/061* (2013.01); *H04L 63/0442* (2013.01); *H04L 63/062* (2013.01)

(58) Field of Classification Search
CPC .............................. H04L 9/3278; H04L 9/085
See application file for complete search history.

(56) References Cited

U.S. PATENT DOCUMENTS

| | | | |
|---|---|---|---|
| 6,128,735 A | 10/2000 | Goldstein et al. |
| 6,182,214 B1 | 1/2001 | Hardjono |
| 6,477,254 B1 | 11/2002 | Miyazaki et al. |
| 6,501,390 B1 | 12/2002 | Chainer et al. |
| 7,564,345 B2 | 7/2009 | Devedas et al. |
| 7,581,248 B2 | 8/2009 | Atkins et al. |
| 7,653,197 B2 | 1/2010 | Van Dijk |
| 7,702,927 B2 | 4/2010 | Devedas et al. |

(Continued)

FOREIGN PATENT DOCUMENTS

| | | |
|---|---|---|
| CA | 2482635 C | 10/2003 |
| CN | 101276389 A | 10/2008 |

(Continued)

OTHER PUBLICATIONS

International Search Report and Written Opinion dated Sep. 20, 2018 in connection with International Application No. PCT/US2018/036014.

(Continued)

*Primary Examiner* — Zachary A. Davis

(57) ABSTRACT

A system and device, including reconfigurable physical unclonable functions ('RPUFs') and threshold cryptography, use cryptographic and physical means of security. A plurality of reconfigurable physical unclonable functions ('RPUFs') and a memory are connected to a processor that is configured to derive information associating the RPUFs with cryptographic shares of a sensitive value, store such information in the memory, and reconfigure a RPUF upon powering up of the device such that information stored in the memory is not valid for the reconfigured RPUF.

20 Claims, 8 Drawing Sheets

(56) References Cited

U.S. PATENT DOCUMENTS

| | | |
|---|---|---|
| 7,839,278 B2 | 11/2010 | Devedas et al. |
| 7,926,089 B2 | 4/2011 | Tulshibagwale et al. |
| 7,962,516 B2 | 6/2011 | Bahrs et al. |
| 8,032,760 B2 | 10/2011 | Tuyls et al. |
| 8,281,127 B2 | 10/2012 | Hayes |
| 8,290,150 B2 | 10/2012 | Erhart et al. |
| 8,346,951 B2 | 1/2013 | Hayes |
| 8,379,856 B2 | 2/2013 | Potkonjak |
| 8,386,990 B1 | 2/2013 | Trimberger et al. |
| 8,418,006 B1 | 4/2013 | Trimberger et al. |
| 8,446,250 B2 * | 5/2013 | Kursawe ............... G06F 21/602 340/10.1 |
| 8,458,489 B2 | 6/2013 | Beckmann et al. |
| 8,463,813 B2 | 6/2013 | Siress et al. |
| 8,468,186 B2 | 6/2013 | Yu |
| 8,510,608 B2 | 8/2013 | Futa et al. |
| 8,516,269 B1 | 8/2013 | Hamlet et al. |
| 8,525,169 B1 | 9/2013 | Edelstein et al. |
| 8,566,579 B2 | 10/2013 | Armstrong et al. |
| 8,577,091 B2 | 11/2013 | Ivanov et al. |
| 8,625,788 B2 | 1/2014 | Pendakur et al. |
| 8,667,265 B1 | 3/2014 | Hamlet et al. |
| 8,752,155 B2 | 6/2014 | Lauper |
| 8,782,396 B2 | 7/2014 | Ziola et al. |
| 8,844,009 B2 | 9/2014 | Walsh et al. |
| 8,848,477 B2 | 9/2014 | Schrijen et al. |
| 8,848,905 B1 | 9/2014 | Hamlet et al. |
| 8,868,923 B1 | 10/2014 | Hamlet et al. |
| 8,912,817 B2 * | 12/2014 | Wang ............... H03K 19/17756 326/38 |
| 8,918,647 B1 | 12/2014 | Wallrabenstein |
| 8,938,792 B2 * | 1/2015 | Koeberl .................. G06F 21/70 726/10 |
| 8,995,660 B2 | 3/2015 | Kobayashi et al. |
| 9,018,972 B1 | 4/2015 | Gurrieri et al. |
| 9,032,476 B2 | 5/2015 | Potkonjak |
| 9,038,133 B2 | 5/2015 | Chellappa et al. |
| 9,049,011 B1 | 6/2015 | Agrawal et al. |
| 9,158,906 B2 | 10/2015 | Guajardo Merchan et al. |
| 9,225,512 B1 | 12/2015 | Trimberger |
| 9,292,692 B2 | 3/2016 | Wallrabenstein |
| 9,672,342 B2 | 6/2017 | Walsh et al. |
| 9,681,302 B2 | 6/2017 | Robinton et al. |
| 9,690,927 B2 | 6/2017 | Chellappa et al. |
| 9,705,854 B2 | 7/2017 | Khazan et al. |
| 9,715,590 B2 | 7/2017 | Gardner et al. |
| 9,755,841 B2 * | 9/2017 | Chen ................... H04L 9/3278 |
| 9,806,718 B2 | 10/2017 | Wallrabenstein |
| 9,946,858 B2 | 4/2018 | Wallrabenstein |
| 10,013,543 B2 | 7/2018 | Walsh et al. |
| 10,044,514 B1 * | 8/2018 | Peterson ............... H04L 9/3247 |
| 10,425,235 B2 | 9/2019 | Wallrabenstein et al. |
| 10,432,409 B2 | 10/2019 | Wallrabenstein |
| 2002/0116611 A1 | 8/2002 | Zhou et al. |
| 2003/0081785 A1 | 5/2003 | Boneh et al. |
| 2003/0088782 A1 | 5/2003 | Forrest |
| 2003/0204743 A1 | 10/2003 | Devadas et al. |
| 2005/0149496 A1 | 7/2005 | Mukherjee et al. |
| 2005/0222896 A1 | 10/2005 | Rhyne et al. |
| 2006/0023887 A1 | 2/2006 | Agrawal et al. |
| 2006/0045262 A1 | 3/2006 | Orlando |
| 2006/0210082 A1 | 9/2006 | Devadas et al. |
| 2006/0271792 A1 | 11/2006 | Devadas et al. |
| 2007/0036353 A1 | 2/2007 | Reznik et al. |
| 2007/0044139 A1 | 2/2007 | Tuyls et al. |
| 2007/0206786 A1 | 9/2007 | Chakraborty |
| 2008/0044027 A1 | 2/2008 | Van Dijk |
| 2008/0069341 A1 | 3/2008 | Relyea |
| 2008/0133912 A1 | 6/2008 | Yamamoto et al. |
| 2008/0181398 A1 | 7/2008 | Pappu |
| 2008/0256549 A1 | 10/2008 | Liu et al. |
| 2008/0256600 A1 | 10/2008 | Schrijen et al. |
| 2008/0304657 A1 | 12/2008 | Tuyls et al. |
| 2009/0063860 A1 | 3/2009 | Barnett et al. |
| 2009/0083833 A1 | 3/2009 | Ziola et al. |
| 2010/0031065 A1 | 2/2010 | Futa et al. |
| 2010/0037055 A1 | 2/2010 | Fazio et al. |
| 2010/0037056 A1 | 2/2010 | Follis et al. |
| 2010/0078636 A1 | 4/2010 | Zachariasse |
| 2010/0085075 A1 | 4/2010 | Luzzi et al. |
| 2010/0122093 A1 | 5/2010 | Tuyls et al. |
| 2010/0127822 A1 | 5/2010 | Devadas |
| 2010/0131752 A1 | 5/2010 | Flegel |
| 2010/0176920 A1 | 7/2010 | Kursawe et al. |
| 2010/0199103 A1 | 8/2010 | Van Rijnswou |
| 2010/0272255 A1 | 10/2010 | Devadas et al. |
| 2010/0293384 A1 | 11/2010 | Potkonjak |
| 2010/0293612 A1 | 11/2010 | Potkonjak |
| 2011/0002461 A1 | 1/2011 | Erhart et al. |
| 2011/0033041 A1 | 2/2011 | Yu et al. |
| 2011/0099071 A1 | 4/2011 | Schepers et al. |
| 2011/0113392 A1 | 5/2011 | Chakraborty et al. |
| 2011/0138475 A1 | 6/2011 | Gordon et al. |
| 2011/0191837 A1 | 8/2011 | Guajardo Merchan et al. |
| 2011/0215829 A1 | 9/2011 | Guajardo Merchan et al. |
| 2011/0299678 A1 | 12/2011 | Deas et al. |
| 2012/0072717 A1 | 3/2012 | Hayes |
| 2012/0072736 A1 | 3/2012 | Kudoh et al. |
| 2012/0072737 A1 | 3/2012 | Schrijen et al. |
| 2012/0124385 A1 | 5/2012 | Klasen et al. |
| 2012/0131340 A1 | 5/2012 | Teuwen et al. |
| 2012/0137137 A1 | 5/2012 | Brickell et al. |
| 2012/0183135 A1 | 7/2012 | Paral et al. |
| 2012/0213359 A1 | 8/2012 | Troncoso Pastoriza et al. |
| 2012/0233674 A1 | 9/2012 | Gladstone et al. |
| 2012/0321077 A1 | 12/2012 | Shiota et al. |
| 2013/0010957 A1 | 1/2013 | Yu et al. |
| 2013/0013931 A1 | 1/2013 | O'Hare et al. |
| 2013/0046990 A1 | 2/2013 | Fahrny et al. |
| 2013/0051552 A1 | 2/2013 | Handschuh et al. |
| 2013/0073860 A1 | 3/2013 | Ibraimi et al. |
| 2013/0094649 A1 | 4/2013 | Tomlinson et al. |
| 2013/0114810 A1 | 5/2013 | Kobayashi et al. |
| 2013/0138710 A1 | 5/2013 | Yamamoto et al. |
| 2013/0142329 A1 | 6/2013 | Bell et al. |
| 2013/0198838 A1 | 8/2013 | Schmidt et al. |
| 2013/0246809 A1 | 9/2013 | Beckmann et al. |
| 2013/0272521 A1 | 10/2013 | Kipnis et al. |
| 2014/0047565 A1 | 2/2014 | Back et al. |
| 2014/0093074 A1 | 4/2014 | Gotze et al. |
| 2014/0108786 A1 | 4/2014 | Kreft |
| 2014/0140513 A1 | 5/2014 | Brightley et al. |
| 2014/0189365 A1 | 7/2014 | Cox et al. |
| 2014/0189890 A1 | 7/2014 | Koeberl et al. |
| 2014/0205089 A1 | 7/2014 | Irwin |
| 2014/0225639 A1 | 8/2014 | Guo et al. |
| 2014/0226813 A1 | 8/2014 | Heffner |
| 2014/0279532 A1 | 9/2014 | Tremlet |
| 2014/0297540 A1 | 10/2014 | Swamy et al. |
| 2014/0328481 A1 | 11/2014 | Morioka |
| 2015/0058928 A1 | 2/2015 | Guo et al. |
| 2015/0071432 A1 | 3/2015 | Zhu et al. |
| 2015/0091747 A1 | 4/2015 | Watanabe |
| 2015/0095655 A1 | 4/2015 | Sherman |
| 2015/0134966 A1 | 5/2015 | Wallrabenstein |
| 2015/0143130 A1 | 5/2015 | Ducharme et al. |
| 2015/0156184 A1 | 6/2015 | Tucker et al. |
| 2015/0172049 A1 | 6/2015 | Chida et al. |
| 2015/0192637 A1 | 7/2015 | Falk et al. |
| 2015/0195088 A1 | 7/2015 | Rostami et al. |
| 2015/0229480 A1 | 8/2015 | Joye et al. |
| 2015/0234751 A1 | 8/2015 | Van der Sluis et al. |
| 2015/0242620 A1 | 8/2015 | Newell et al. |
| 2015/0278505 A1 | 10/2015 | Lu et al. |
| 2015/0295722 A1 | 10/2015 | Falk et al. |
| 2015/0317480 A1 | 11/2015 | Gardner et al. |
| 2015/0317481 A1 | 11/2015 | Wallrabenstein |
| 2015/0318994 A1 | 11/2015 | Walsh et al. |
| 2015/0319000 A1 | 11/2015 | Falk et al. |
| 2015/0341792 A1 | 11/2015 | Wallrabenstein et al. |
| 2016/0021096 A1 | 1/2016 | Wallrabenstein |
| 2016/0072623 A1 | 3/2016 | Joye et al. |
| 2016/0080158 A1 * | 3/2016 | Gehrer ................... G09C 1/00 380/28 |

(56) References Cited

U.S. PATENT DOCUMENTS

| | | |
|---|---|---|
| 2016/0154981 A1 | 6/2016 | Wesselhoff |
| 2016/0170907 A1 | 6/2016 | Walsh et al. |
| 2016/0261409 A1 | 9/2016 | French et al. |
| 2016/0269186 A1 | 9/2016 | Wallrabenstein |
| 2016/0378983 A1 | 12/2016 | Spurlock et al. |
| 2017/0063559 A1 | 3/2017 | Wallrabenstein et al. |
| 2017/0132434 A1 | 5/2017 | Wang et al. |
| 2017/0149572 A1* | 5/2017 | Wallrabenstein ............ H03K 19/17748 |
| 2017/0270288 A1 | 9/2017 | Walsh et al. |
| 2018/0096172 A1 | 4/2018 | Lu |
| 2018/0248706 A1 | 8/2018 | Wallrabenstein |
| 2018/0351752 A1 | 12/2018 | Wallrabenstein et al. |
| 2018/0351753 A1 | 12/2018 | Gardner et al. |
| 2019/0190726 A1 | 6/2019 | Wallrabenstein |

FOREIGN PATENT DOCUMENTS

| | | |
|---|---|---|
| CN | 101847296 A | 9/2010 |
| CN | 103154925 A | 6/2013 |
| CN | 103391199 A | 11/2013 |
| CN | 106576046 A | 4/2017 |
| DE | 10 2014 208 212 | 11/2015 |
| EP | 2 320 344 A2 | 7/2011 |
| EP | 2560341 A2 | 2/2013 |
| EP | 2684331 A1 | 1/2014 |
| JP | 2003-051821 A | 2/2003 |
| JP | 2011-526113 A | 9/2011 |
| JP | 2012-503814 A | 2/2012 |
| JP | 2012-509039 A | 4/2012 |
| KR | 20090104421 A | 10/2009 |
| WO | WO 2009/156904 A1 | 12/2009 |
| WO | WO 2010/035202 A1 | 4/2010 |
| WO | WO 2010/055171 A1 | 5/2010 |
| WO | WO 2010/105993 A2 | 9/2010 |
| WO | WO 2014/037812 A1 | 3/2014 |
| WO | WO 2014/184899 A1 | 11/2014 |
| WO | WO 2015/200196 A1 | 12/2015 |
| WO | WO 2016/141386 A1 | 9/2016 |

OTHER PUBLICATIONS

International Search Report and Written Opinion dated Sep. 20, 2018 in connection with International Application No. PCT/US2018/036023.

Extended European Search Report dated Sep. 6, 2018 in connection with European Application No. 18175600.8.

Chen, Reconfigurable physical unclonable function based on probabilistic switching of RRAM. Electron Lett. Apr. 13, 2015;51(8):615-7.

Wang et al., Verifiable (t, n)Threshold Signature Scheme based on Elliptic Curve. Wuhan Univ J Natural Sci. 2005;10(1):165-8.

Extended European Search Report dated Jan. 18, 2018 in connection with European Application No. 15811003.1.

Duren et al., Resilient Device Authentication System (RDAS) through SIOMETRICS. Eighth Annual Cyber Security and Information Intelligence Workshop. ACM. 2012; pp. 1-4.

EIROA, Hardware authentication based on PUFs and SHA-3 2nd round candidates. IEEE. 2009; pp. 1-4.

Shpantzer, Implementing Hardware Roots of Trust: The Trusted Platform Module Comes of Age. A SANS Whitepaper. Jun. 2013, pp. 1-17.

Zhao et al., Providing Root of Trust for ARM TrustZone using On-Chip SRAM. TrustED '14. ACM. Nov. 3, 2014; pp. 25-36.

Extended European Search Report dated Sep. 28, 2018 in connection with European Application No. EP 16759655.0.

International Search Report and Written Opinion dated Jun. 3, 2016 for Application No. PCT/US2016/021275.

Abe et al., Adaptively Secure Feldman VSS and Applications to Universally-Composable Threshold Cryptography. Advances in Cryptology. CRYPTO 2004. 2004;3152:317-34.

Armknecht et al., A Formal Foundation for the Security Features of Physical Functions. Proceedings of the 2011 IEEE Symposium on Security and Privacy, SP '11. 2011;397-412.

Becker et al., Stealthy Dopant-Level Hardware Trojans. Crytographic Hardware and Embedded Systems, CHES 2013. 2013;8086:197-214. 18 pages.

Bilgin et al., A More Efficient AES Threshold Implementation. Cryptology ePrint Archive. Report 2013/967. 2013. 17 pages.

Blakley, Safeguarding cryptographic keys. Proceedingsof the 1979 AFIPS National Computer Conference. 1979;313-7.

Brzuska et al., Physically Uncloneable Functions in the Universal Composition Framework. Advances in Cryptology—CRYPTO 2011—31st Annual Cryptology Conference. 2011;6841:51-70.

Changgen et al., Threshold Signcryption Scheme Based on Elliptic Curve Cryptosystem and Verifiable Secret Sharing. International Conference on Wireless Communications, Networking and Mobile Computing. 2005;2:1136-9.

Chen et al., An efficient threshold group signature scheme. IEEE Region 10 Conference TENCON. 2004;2(B):13-6.

Coron, Resistance Against Differential Power Analysis for Elliptic Curve Cryptosystems. Crytpographic Hardware and Embedded Systems. 1999;1717:292-302.

Dodis et al., Fuzzy Extractors: How to Generate Strong Keys from Biometrics and Other Noisy Data. EUROCRYPT 2004. 2004;3027:523-40.

Duc et al., A survey on RFID security and provably secure grouping-proof protocols. Int J Internet Tech Secured Trans. 2010;2(3/4):222-249.

Dwoskin et al., Hardware-rooted Trust for Secure Key Management and Transient Trust. Proceedings of the 14th ACM Conference: Computer & Communications Security. Nov. 2, 2007;389-400.

Eichhorn et al., Logically Reconfigurable PUFs: Memory-based Secure Key Storage. Proceedings of the Sixth ACM Workshop on Scalable Trusted Computing, STC '11. Oct. 17, 2011;59-64. 6 pages.

Ertaul et al., ECC Based Threshold Cryptography for Secure Data Forwarding and Secure Key Exchange in MANET (I). Networking 2005, Networking Technologies, Services, and Protocols; Performance of Computer and Communication Networks; Mobile and Wireless Communications Systems. 2005;3462:102-13.

Feldman, A Practical Scheme for Non-interactive Verifiable Secret Sharing. Proceedings of the 28th Annual Symposium on Foundations of Computer Science, SFCS '87. 1987;427-37.

Frankel et al., Optimal-Resilience Proactive Public-Key Cryptosystems. 38th Annual Symposium on Foundations of Computer Science. 1997;384-93. 12 pages.

Frikken et al., Robust Authentication using Physically Unclonable Fucntions. Information Security. 2009;5735:262-77.

Garcia-Alfaro et al., Security Threat Mitigation Trends in Low-cost RFID Systems. Data Privacy Management and Autonomous Spontaneous Security. 2010. 15 pages.

Gassend et al., Silicon Physical Random Functions. Proceedings of the 9th ACM Conference on Computer and Communications Security, CCS '02. 2002;148-60.

Gennaro et al., Secure Applications of Pedersen's Distributed Key Generation Protocol. Topics in Cryptology. CT-RSA 2003. 2003;2612:373-90.

Gennaro et al., Secure Distributed Key Generation for Discrete-Log Based Cryptosystems. Advances in Cryptology. EUROCRYPT 99. 1999;1592:295-310. 16 pages.

Handschuh et al., Hardware Intrinsic Security from Physically Unclonable Functions. Towards Hardware-Intrinsic Security, Information Security and Cryptography. 2010;39-53.

Herzberg et al., Proactive Public Key and Signature Systems. Proceedings of the 4th ACM Conference on Computer and Communications Security. CCS '97. 1997;100-10. 11 pages.

Herzberg et al., Proactive Secret Sharing Or: How to Cope With Perpetual Leakage. Advances in Cryptology. CRYPTO 95. 1995;963:339-52.

Holcomb et al., Initial SRAM State as a Fingerprint and Source of True Random Numbers for RFID Tags. Proceedings of the Conference on RFID Security. 2007. 12 pages.

(56) References Cited

OTHER PUBLICATIONS

Hori et al., Quantitative and Statistical Performance Evaluation of Arbiter Physical Unclonable Functions on FPGAs. 2010 International Conference on Reconfigurable Computing and FPGAs (ReConFiq). 2010;298-303. 6 pages.
Horstmeyer et al., Physically secure and fully reconfigurable data storage using optical scattering. IEEE International Symposium on Hardware Oriented Security and Trust (HOST). 2015;157-62. 6 pages.
Hua-Qun et al., Verifiable (t, n) Threshold Signature Scheme based on Elliptic Curve. Wuhan Univ J Nat Sci. 2005;10(1):165-8.
Ibrahim et al., A Robust Threshold Elliptic Curve Digital Signature Providing a New Verifiable Secret Sharing Scheme. IEEE 46th Midwest Symposium on Circuits and Systems. 2003;1:276-80. 5 pages.
Jarecki et al., Adaptively Secure Threshold Cryptography: Introducing Concurrency, Removing Erasures (Extended Abstract). Advances in Cryptology. EUROCRYPT 2000. 2000;1807:223-45.
Juels et al., A Fuzzy Commitment Scheme. Proceedings of the 6th ACM Conference on Computer and Communications Security, CCS '99. 1999;28-36. 9 pages.
Karakoyunlu et al., Differential template attacks on PUF enable cryptographic devices. IEEE International Workshop on Information Forensics and Security (WIFS). Dec. 12-15, 2010;1-6.
Katzenbeisser et al., PUFs: Myth, Fact or Busted? A Security Evaluation of Physically Unclonable Functions (PUFs) Cast in Silicon (Extended Version). Cryptographic Hardware and Embedded Systems—CHES '12. 2012;283-301. 18 pages.
Katzenbeisser et al., Recyclable PUFs: logically reconfigurable PUFs. J Cryto Eng. 2011;1(3):177-86. 15 pages.
Khoshroo, Design and Evaluation of FPGA-Based Hybrid Physically Unclonable Functions. Thesis. Graduate Program in Electrical and Computer Engineering. Western University. London, Ontario, Canada. May 2013. 107 pages.
Kim et al., Threshold Signature Schemes for ElGamal Variants. Comp Stan Interf. 2011;33(4):432-7.
Kirkpatrick et al., PUF ROKs: A Hardware Approach to Read-Once Keys. Proceedings of the 6th ACM Symposium on Information, Computer and Communications Security, ASIACCS '11. 2011;155-64.
Kirkpatrick et al., Software Techniques to Combat Drift in PUF-based Authentication Systems. Workshop on Secure Component and System Identification. 2010. 9 pages.
Kocher et al., Differential Power Analysis. Proceedings of the 19th Annual International Cryptology Conference on Advances in Cryptology, CRYPTO '99. 1999;388:97. 10 pages.
Kocher et al., Introduction to Differential Power Analysis. J Cryptogr Eng. Mar. 3, 2011;1:5-27.
Krzywiecki et al., Coalition Resistant Anonymous Broadcast Encryption Scheme Based on PUF. TRUST 2011. 2011;6740:48-62.
Krzywiecki et al., Collusion Resistant Anonymous Broadcast Encryption Scheme Based on PUF. TRUST 2011. Jun. 22-24, 2011. 93 pages.
Kumar et al., Extended abstract: The Butterfly PUF Protecting IP on Every FPGA. IEEE International Workshop on Hardware-Oriented Security and Trust. 2008;67-70. 4 pages.
Kursawe et al., Reconfigurable Physical Unclonable Functions—Enabling Technology for Tamper-Resistant Storage. 2009 IEEE International Hardware-Oriented Security and Trust, HOST '09. 2009;22-9.
Lao et al., Reconfigurable architectures for silicon physical unclonable functions. IEEE International Conference on Electro/Information Technology (EIT). 2011;1-7.
Lee et al., A technique to build a secret key in integrated circuits for identification and authentication applications. IEEE Symposium on VLSI Circuits: Digest of Technical Papers. 2004;176-9. 4 pages.
Libert et al., Adaptively Secure Non-interactive Threshold Cryptosystems. Automata, Languages and Programming. 2011;588-600. 23 pages.
Maes et al., Intrinsic PUFs from flip-flops on reconfigurable devices. 3rd Benelux Workshop on Information and System Security (WISSec 2008). 2008. 17 pages.
Maiti et al., The Impact of Aging on an FPGA-Based Physical Unclonable Function. International Conference on Field Programmable Logic and Applications (FPL). 2011;151-6.
Maiti, A Systematic Approach to Design an Efficient Physical Unclonable Function. Virginia Polytechnic Institute and State University. Dissertation. Apr. 30, 2012. 166 pages.
Majzoobi et al., Techniques for Design and Implementation of Secure Reconfigurable PUFs. ACM Trans Reconfig Tech Sys. Mar. 2009;2(1):5.1-33.
Merli et al., Semi-invasive EM Attack on FPGA RO PUFs and Countermeasures. Proceedings of the Workshop on Embedded Systems Security, WESS '11. 2011;2.1-9.
Merli et al., Side-Channel Analysis of PUFs and Fuzzy Extractors. Trust and Trustworthy Computing. 2011;6740:33-47.
Moradi et al., Pushing the Limits: A Very Compact and a Threshold Implementation of AES. Advances in Cryptology. EUROCRYPT 2011. 2011;6632:69-88.
Nabeel et al., Authentication and key management for advanced metering infrastructures utilizing physically unclonable function. IEEE Third International Conference on Smart Grid Communications (SmartGridComm). 2012;324-9. 6 pages.
Nikova et al., Threshold Implementations Against Side-Channel Attacks and Glitches. Information and Communications Security. 2006;4307:529-45. 17 pages.
Paral et al., Reliable and Efficient PUF-based Key Generation using Pattern Matching. IEEE International Symposium on Hardware-Oriented Security and Trust (HOST). 2011;128-33.
Pedersen, A Threshold Cryptosystem without a Trusted Party. Advances in Cryptology. EUROCRYPT 91. 1991;547:522-6.
Pedersen, Non-Interactive and Information-Theoretic Secure Verifiable Secret Sharing. Advances in Cryptology, CRYPTO 91. 1992;576:129-40.
Peeters et al., Towards More Secure and Reliable Access Control. Perv Comp. 2011;11(3). 8 pages.
Peeters, Security Architecture for Things That Think. Department of Electrical Engineering. Arenberg Doctoral School of Science, Engineering and Technology. Dissertation. Jun. 2012 150 pages.
Pfaffhauser, Protocols for MPC based on Unclonability. Department of Computer Science, ETH Zurich. Master Thesis. Apr. 12, 2011. 53 pages.
Ravikanth, Physical one-way functions. Massachusetts Institute of Technology. Dissertation. 2001. 154 pages.
Ruan et al., Elliptic curve ElGamal Threshold-based Key Management Scheme against Compromise of Distributed RSUs for VANETs. J Info Proc. 2012;20(4). 8 pages.
Rührmair et al., Applications of High-Capacity Crossbar Memories in Cryptography. IEEE Trans Nanotechnol. May 2011;10(3):489-98.
Rührmair et al., Modeling Attacks on Physical Unclonable Functions. Proceedings of the 17th ACM Conference on Computer and Communications Security, CCS '10. 2010;237-49.
Rührmair et al., Power and Timing Side Channels for PUFs and their Efficient Exploitation. IACR Cryptology ePrint Archive 2013;851. 14 pages.
Rührmair et al., PUFs in Security Protocols: Attack Models and Security Evaluations. 2013 IEEE Symposium on Security and Privacy. 2013;286-300.
Sardar et al., Zero Knowledge Proof in Secret Sharing Scheme Using Elliptic Curve Cryptography. Global Trends in Computing and Communication Systems. 2012;269:220-6.
Schuster, Side-Channel Analysis of Physical Unclonable Functions (PUFs). Technische Universitat Munchen. Thesis. 2010. 57 pages.
Shamir, How to Share a Secret. Comm ACM. 1979;22(11):612-3.
Shao, Repairing Efficient Threshold Group Signature Scheme. Int J Netw Sec. Sep. 2008;7(2):218-22.
Suh et al., Physical Unclonable Functions for Device Authentication and Secret key Generation. Proceedings of the 44th annual Design Automation Conference, DAC '07. 2007;9-14.

(56) References Cited

OTHER PUBLICATIONS

Tang, ECDKG: A Distributed Key Generation Protocol Based on Elliptic Curve Discrete Logarithm. University of Southern California, Department of Computer Science. Technical Report 04-838. 2004. 20 pages.
Tuyls et al., Read-Proof Hardware from Protective Coatings. Proceedings of the 8th International Conference on Cryptographic Hardware and Embedded Systems. CHES '06. 2006;4249:369-83. 15 pages.
Van Dijk et al., Physical Unclonable Functions in Cryptographic Protocols: Security Proofs and Impossibility Results. Cryptolgoy ePrint Archive. Report 2012/228. Apr. 25, 2012. 36 pages.
Wu et al., On Foundation and Construction of Physical Unclonable Functions. IACR Cryptology ePrint Archive. 2010;171. 18 pages.
Yu et al., Lightweight and Secure PUF Key Storage Using Limits of Machine Learning. Proceedings of the 13th International Conference on Cryptographic Hardware and Embedded Systems, CHES '11. 2011;6917:358-73.
Yu et al., Recombination of Physical Unclonable Functions. GOMACTech. 2010. 4 pages.
Zhang et al., Exploiting Process Variation and Programming Sensitivity of Phase Change Memory for Reconfigurable Physical Unclonable Functions. IEEE Trans Info Forensics Sec. 2014;9(6):921-32.
Zheng et al., How to Construct Efficient Signcryption Schemes on Elliptic Curves. Inf Proc Lett. 1998;68(5):227-33.
Zheng, Digital Signcryption or How to Achieve Cost(Signature & Encryption) « Cost(Signature) + Cost(Encryption). Advances in Cryptology. CRYPTO '97. 1997;1294:165-79.
International Search Report and Written Opinion dated Sep. 16, 2015 for Application No. PCT/US2015/036937.
International Preliminary Report on Patentability dated Jun. 16, 2016 for Application No. PCT/US2015/036937.
International Search Report and Written Opinion dated Jun. 3, 2016 for Application No. PCT/US2016/021264.
International Preliminary Report on Patentability dated Sep. 14, 2017 in connection with International Application No. PCT/US2016/021275.
[No Author Listed], D6.5: Publishable Summary. HINT. Seventh Framework Programme. Project 317930. Dec. 11, 2013. 5 pages.
Abercrombie et al., Secure Cryptographic Key Management System (CKMS) Considerations for Smart Grid Devices. CSIIRW '11 Proceedings of the Seventh Annual Workshop on Cyber Security and Information Intelligence Research, Oak Ridge, TN. Article No. 59. Oct. 12-14, 2011. 4 pages.
Al Ibrahim et al., Cyber-Physical Security Using System-Level PUFs. 7th International IEEE Wireless Communications and Mobile Computing Conference (IWCMC). 2011. 5 pages.
Asim et al., Physical Unclonable Functions and Their Applications to Vehicle System Security. Vehicular Technology Conference, VTC Spring 2009. 10 pages.
Feiri et al., Efficient and Secure Storage of Private Keys for Pseudonymous Vehicular Communication. ACM CyCAR '13. Nov. 4, 2013;9-18.
Gardner et al., Toward Trusted Embedded Systems. 2nd Annual NSA Trusted Computing Conference and Exposition. Orlando, FL. Sep. 20, 2011. 25 pages.
Goldwasser et al., One-time programs, Proceedings of the 28th Annual conference on Cryptology: Advances in Cryptology. CRYPTO 2008. 2008;39-56.
Guajardo et al., FPGA intrinsic PUFs and Their Use for IP Protection. Proceedings of the 9th Cryptographic Hardware and Embedded Systems Workshop (CHES). 2007;4727. 22 pages.
Guajardo et al., Physical Unclonable Functions and Public-Key Crypto for FPGA IP Protection. International Conference on Field Programmable Logic and Applications. 2007. 8 pages.
Huang et al., To verify embedded system software integrity with TCM and FPGA. IEEE. Aug. 2010;65-70.
Kerr et al., PEAR: A Hardware Based Protocol Authentication System. SPRINGL '10 Proceedings of the 3rd ACM 3IGSPATIAL International Workshop on Security and Privacy in GIS and LBS. 2010. 8 pages.
Kerr, Secure Physical System Design Leveraging PUF Technology. Purdue University. Thesis. May 2012. 87 pages.
Khandavilli, A Mobile Role Based Access Control System Using Identity Based Encryption With Non-Interactive 7ero Knowledge Proof of Authentication. Dalhousie University Repository, Faculty of Graduate Studies. Thesis. Apr. 5, 2012. 65 pages.
Kirkpatrick et al., Enforcing Physically Restricted Access Control for Remote Data. Proceedings of CODASPY. 2011. 10 pages.
Kirkpatrick et at, Physically Restricted Authentication and Encryption for Cyber-physical Systems. DHS Workshop on Future Directions in Cyber-physical Systems Security. 2009. 5 pages.
Kish et al., Physical Uncloneable Function Hardware Keys Utilizing Kirchhoff-Law Johnson-Noise Secure Key Exchange and Noise-Based Logic. Fluctuation Noise Lett. 2013;12. 9 pages.
Langheinrich et al., Practical Minimalist Cryptography for RFID Privacy. IEEE Sys J. Dec. 2007;1(2). 19 pages.
Langheinrich et al., RFID Privacy Using Spatially Distributed Shared Secrets. International Symposium on Ubiquitous Computing Systems (UCS). 2007;1-16.
Maiti et al., Physical Unclonable Function and True Random Number Generator: a Compact and Scalable implementation. GLSVLSI '09 Proceedings of the 19th ACM Great Lakes Symposium on VLSI. 2009. 4 pages.
Owusu et al., OASIS: On Achieving a Sanctuary for Integrity and Secrecy on Untrusted Platforms. Proceedings of the 2013 ACM SIGSAC conference on Computer & communications security. ACM. 2013;13-24. 12 pages.
Potkonjak et al., Differential Public Physically Unclonable Functions: Architecture and Applications. DAC '11 Proceedings of the 48th Design Automation Conference. 2011. 7 pages.
Rigaud, ed., D3.1: Report on Protocol choice and implementation. HINT. Project 317930. Aug. 4, 2014. 35 pages.
Rust, ed., D1.1: Report on use case and architecture requirements. Seventh Framework Programme. Holistic Approaches for Integrity of ICT-Systems. ICT-317930. Feb. 28, 2013. 50 pages.
Sadeghi et al., Short Paper: Lightweight Remote Attestation Using Physical Functions. ACM. Jun. 2011;109-14.
Suh et al., Aegis: A Single-Chip Secure Processor. IEEE Des Test Comp. 2007;570-80.
Tuyls et al., Capacity and Examples of Template Protecting Biometric Authentication Systems. Biometric Authentication. 2004;3087:158-70. 13 pages.
Yu et al., Secure and robust error correction for physical unclonable functions. IEEE Des Test. Jan. 2010;27(1):48-65.
International Preliminary Report on Patentability dated Dec. 19, 2019 in connection with International Application No. PCT/US2018/036023.
Harn, Group-oriented (t, n) threshold digital signature scheme and digital multisignature. IEE Proc.-Comput. Digit. Tech. Sep. 1994; 141 (5):307-313.

* cited by examiner

SYSTEM AND DEVICE INCLUDING RECONFIGURABLE PHYSICAL UNCLONABLE FUNCTIONS AND THRESHOLD CRYPTOGRAPHY

FIELD OF THE DISCLOSURE

This disclosure relates generally to hardware verification, and in particular but not exclusively, to binding authentication to protect against tampering and subversion by substitution.

BACKGROUND

A physical unclonable function or 'PUF' is a physical entity capable of generating an output ('response') to a given input ('challenge') that is unique to that particular PUF such that it can be regarded as a 'fingerprint.' This capacity is typically arrived at by devising the PUF in such a way that its output depends upon features that differ randomly in each device due to minor manufacturing variations. Thus a PUF cannot be readily replicated with the correct fingerprint, even with full knowledge of its circuit layout.

Typical PUF-based protocols fall into two broad categories: (1) a simple challenge-response provisioning process like the one described below in Protocol 1, or (2) cryptographic augmentation of a device's PUF response such that the raw PUF output never leaves the device. These approaches may require external entities to handle auxiliary information (e.g., challenges and their associated helper data) that is unsupported or superfluous in existing public key cryptography standards, and/or involve a hardware device authenticating to a challenge applied during an initial enrollment process, and/or are premised on the hardware device always recovering essentially the same response to a given challenge.

One challenge facing PUF-based systems is side channel attacks, which seek to observe and analyze auxiliary environmental variables to deduce information about sensitive information, such as cryptographic key material or the PUF output.

A reconfigurable PUF or 'RPUF' is a PUF that can be altered to generate a new set of responses to the same challenges. A PUF's set of responses and challenges is often called a 'mapping,' and the new mapping after reconfiguration of a RPUF is preferably fully different from and unrelated to the RPUF's other challenge-response mappings. RPUFs can be reversibly configurable such that after reconfiguration the RPUF can be reconfigured again to a prior configuration, or irreversibly configurable such that it is not possible to restore a prior challenge-response mapping. Logically-reconfigurable PUFs ('L-RPUFs') utilize a programmable feature to change configurations and are typically reversible, and physically-reconfigurable PUFs ('P-RPUFs') are reconfigured by imposing a physical change and are typically irreversibly configurable.

SUMMARY OF THE DISCLOSURE

A system and device including reconfigurable physical unclonable functions ('RPUFs') and threshold cryptography uses cryptographic and physical means of security. In one embodiment, a plurality of reconfigurable physical unclonable functions ('RPUFs') and a memory are connected to a processor that is configured to derive information associating the RPUFs with cryptographic shares of a sensitive value, store such information in the memory, and reconfigure a RPUF upon powering up of the device such that information stored in the memory is not valid for the reconfigured RPUF. One or more redundant RPUFs may be used in place of one PUF. When the system or device is powered up, one of the RPUFs is selected and transitioned from its previous configuration to a new configuration, invalidating any information associating the RPUF with shares of a sensitive value based on the old state of that RPUF. An RPUF that was not reconfigured is then used to recover the reconfigured RPUF's shares using its stored information.

Further embodiments provide for shares to be held by multiple PUFs so that each PUF is mapped to less than all shares. These embodiments can provide power failure event resiliency, in contrast to an approach where individual PUFs are associated with all shares. (t, n) threshold sharing can be tailored so t is less than n (e.g., by 1, 2, 3, etc.) to enable tolerance for benign power events.

Alternately, one RPUF may be used for each share of the sensitive value. An RPUF is selected and transitioned from its previous configuration to a new configuration when the device is powered up, invalidating any information associating the RPUF with a share of a sensitive value based on the old state of that RPUF. RPUFs that were not reconfigured can then be used to generate a replacement share for the reconfigured RPUF's invalidated share using its stored information.

In another embodiment based on a single PUF queried with multiple challenges (to generate different shares of the sensitive value), an RPUF is used with one parameter to recover values and a different parameter to store values, with the values not being repeated in ensuing share-refresh cycles. In another embodiment, a pair of RPUFs is used instead, with one RPUF used to recover values and another RPUF used to store values.

According to one aspect, an authenticatable device, implementing a threshold sharing of a hardware based identity that comprises a (t, n) sharing of a sensitive value, is provided. The authenticatable device comprises n reconfigurable physical unclonable functions ('RPUFs') associated with at least one respective share of the threshold sharing of the sensitive value, a memory, and at least one processor configured to: invalidate any shares of a respective RPUF based on reconfiguration of the respective RPUF, reconfigure, randomly, one of the n RPUFs responsive to power-up of the device, and generate information derived from at least t valid RPUF shares to enable one or more cryptographic operations that require the sensitive value without generating the sensitive value in memory.

According to one aspect, an authenticatable device implementing a threshold sharing of a hardware based identity that comprises a (t, n) sharing of a sensitive value is provided. The authenticatable device comprises n reconfigurable physical unclonable functions ('RPUFs') associated with at least one respective share of the threshold sharing of the sensitive value, a memory, and at least one processor configured to: reconfigure, randomly, one of the n RPUFs after power-up of the device invalidating any share of the reconfigured RPUF, and perform one or more cryptographic operations that require the sensitive value without generating the sensitive value, utilizing information derived from at least t valid RPUF shares.

According to one embodiment, the at least one processor is further configured to identify invalid shares. According to one embodiment, the at least one processor is further configured to construct a valid replacement share for a reconfigured RPUF, based on at least t valid RPUF shares.

According to one embodiment, the at least one processor is configured to store a challenge and helper value for the valid replacement share. According to one embodiment, the at least one processor is configured to enroll the n RPUFs in the (t, n) sharing of the sensitive value without generating the sensitive value in the memory. According to one embodiment, the n RPUFs are associated with the at least one respective share of the sensitive value by an associated challenge and helper pair.

According to one embodiment, the at least one processor is configured to enroll the n RPUFs in the (t, n) sharing of the sensitive value so that t valid shares are required to reconstruct the sensitive value where t is less than n. According to one embodiment, the threshold sharing is constructed where n−t is at least two. According to one embodiment, the n RPUFs are associated with multiple shares. According to one embodiment, the at least one processor is configured to trigger a share refresh responsive to enabling a request to execute the one or more cryptographic operations.

According to one embodiment, the at least one processor is configured to generate sub-shares associated with the valid RPUF shares. According to one embodiment, the at least one processor is configured to blind the sub-shares. According to one embodiment, the at least one processor is configured to generate threshold shares of zero values to blind the sub-shares.

According to one aspect, a computer implemented method for threshold sharing of a hardware based identity comprising a (t, n) sharing of a sensitive value on an authentication device is provided. The method comprises: randomly reconfiguring, by at least one processor, one of n reconfigurable physical unclonable functions ('RPUFs') responsive to power-up of the device invalidating any share of the reconfigured RPUF, issuing, by the at least one processor, challenges to at least t RPUFs to recover respective shares of the threshold sharing of the sensitive value, and enabling, by the at least one processor, one or more cryptographic operations that require the sensitive value without generating the sensitive value in memory utilizing information derived from at least t valid RPUF shares.

According to one embodiment, the method further comprises combining a threshold operation on multiple shares to generate an output that enables the one or more cryptographic operations. According to one embodiment, the method further comprises communicating the output for execution of the one or more cryptographic operations.

According to one embodiment, the method further comprises identifying, by the at least one processor, invalid shares. According to one embodiment, the method further comprises constructing, by the at least one processor, a valid replacement share for an invalid share based on at least t valid RPUF shares. According to one embodiment, the method further comprises storing, by the at least one processor, a challenge and helper pair for the valid replacement share.

According to one embodiment, the method further comprises enrolling the n RPUFs in the (t, n) sharing of the sensitive value without generating the sensitive value in the memory. According to one embodiment, the method further comprises associating, by the at least one processor, the n RPUFs with at least one respective share of the sensitive value with an associated challenge and helper pair. According to one embodiment, the method further comprises triggering, by the at least one processor, a share refresh responsive to enabling a request to execute the one or more cryptographic operations.

According to one aspect, an authenticatable device implementing a threshold sharing of a hardware based identity that comprises a (t, n) sharing of a sensitive value is provided. The authenticatable device comprises n reconfigurable hardware identity circuits for generating respective hardware specific output based on a respective input challenge, the n reconfigurable hardware identity circuits associated with the at least one respective share of the threshold of the sensitive value, a memory, and at least one processor configured to: reconfigure, randomly, one of the n hardware identity circuits after power-up of the device invalidating any share of the reconfigured hardware identity circuit, and perform one or more cryptographic operations that require the sensitive value without generating the sensitive value, utilizing information derived from at least t valid hardware identity circuit shares. According to one embodiment, the n hardware identity circuits comprise reconfigurable physical unclonable functions ('RPUFs').

DETAILED DESCRIPTION

Figure 1:
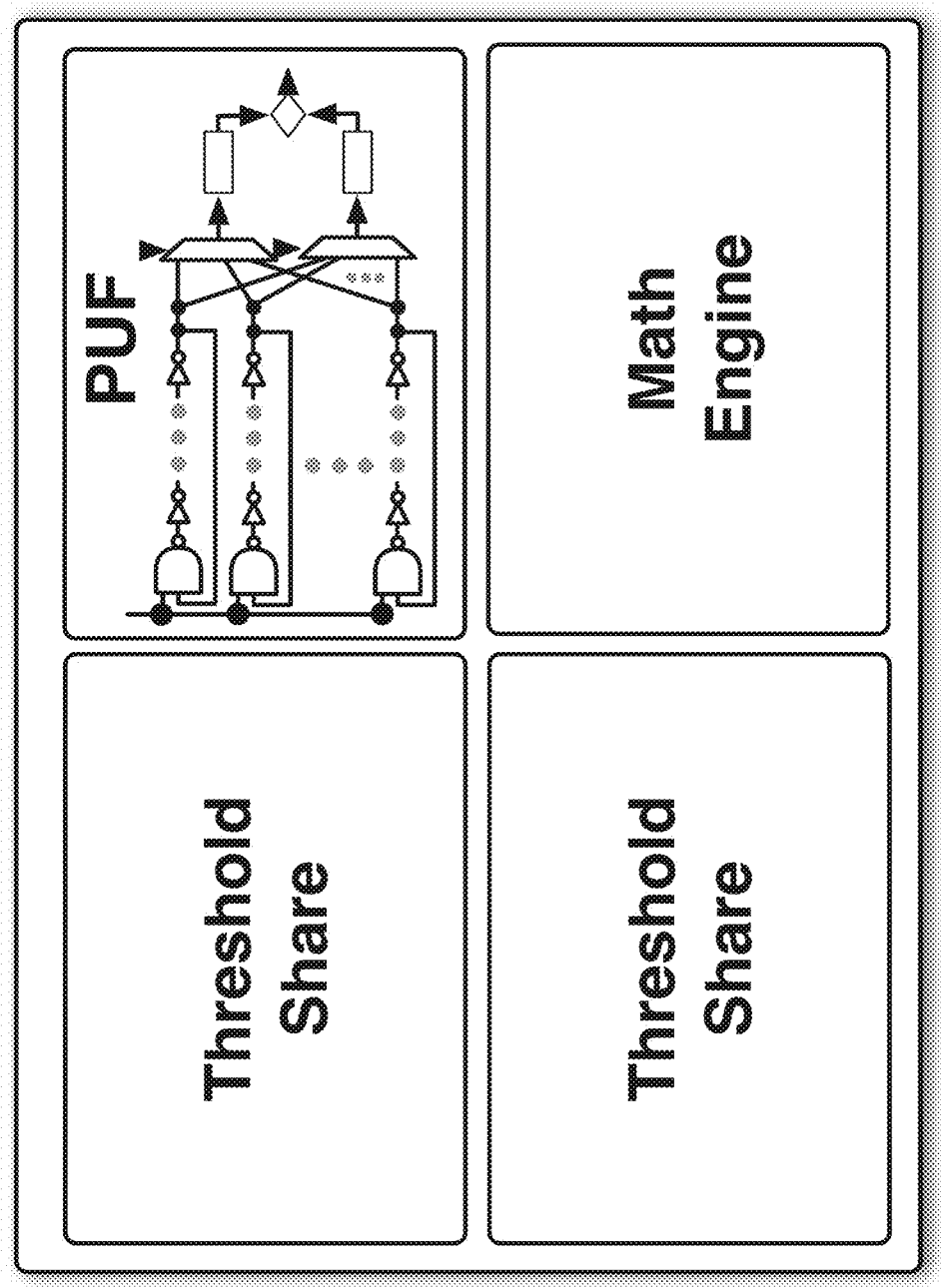
FIG. 1 is a functional diagram of a device having a single PUF circuit and two threshold shares.

According to some embodiments, compliance with share expiration protocols can be enforced through the use of reconfigurable PUFs (RPUFs). In one embodiment of the invention, a device's PUF root of trust's challenge-response behavior is internalized and used to generate shares of a sensitive value (e.g., a private key) over which shares the device can execute arbitrary threshold cryptographic operations (e.g., decryption, digital signature generation, zero knowledge proofs). Preferably the threshold operations can be executed without ever generating, reconstructing, or storing the sensitive value. In further embodiments, the shares are periodically refreshed (updated) and threshold share operations may be staggered such that one share is stored as a challenge-helper pair, and thus only one share exists in volatile memory at any given time. In one embodiment, multiple PUFs are used to generate multiple corresponding shares; in another embodiment, a single PUF is queried multiple times with different challenges to generate multiple corresponding shares. RPUFs can be used in place of ordinary PUFs to increase the security of this scheme.

Aspects of the disclosure are described with reference to the example of an embodiment utilizing elliptic curve cryptography (including the associated terminology and conventions), but the described embodiments and approaches apply equally to various other cryptographic schemes such as ones employing different problems like discrete logarithm or factoring (in which regard the teachings of U.S. Pat. No. 8,918,647 are incorporated here by reference), and the disclosure is not limited by the various additional features described herein that may be employed with or by virtue of providing examples of implementation.

The following detailed description sets forth details of various embodiments concerning any one or more of the following: 1) threshold cryptography, wherein a sensitive value is divided into shares; 2) the use of PUFs with cryptographic shares; 3) the periodic adoption of new ('refreshed' or 'updated') shares; 4) dynamic membership (i.e., removal or addition) of shares in threshold cryptography; and 5) embodiments employing reconfigurable PUFs to enforce the invalidation of shares.

Threshold Cryptography

Threshold cryptography involves distributing cryptographic operations among a set of participants such that operations use the collaboration of a quorum of participants. In some conventional approaches, trusted dealer $\mathcal{D}$ generates a master asymmetric key pair $\langle \mathcal{P}^{pub}, \mathcal{P}^{priv} \rangle$ for the set of participants $p_i \in \mathcal{P}$, $|\mathcal{P}|=n$. The private key is then split among the n participants, with each participant receiving a share of $\mathcal{P}^{priv}$. This constitutes a (t, n) sharing of $\mathcal{P}^{priv}$, such that a quorum of at least t participants combine their private shares in order to perform operations using the master private key.

While other secret schemes can be used, an example will be described employing Shamir's polynomial interpolation construction, which can be used for sharing a secret. A polynomial $f(\cdot)$ of degree $t-1$ is defined, where the coefficients $c_i$ remain private: $f(x)=c_0+c_1 x+ \ldots +c_{t-1}$ mod q. Without knowledge of the coefficients, $f(\cdot)$ can be evaluated when at least t points of $f(\cdot)$ are known by applying Lagrange's polynomial interpolation approach. A private key $\mathcal{P}^{priv}$ can be set as the free coefficient $c_0$ (i.e., $f(0)=\mathcal{P}^{priv}$), and a set of shares of the private key distributed to the participants. To split the private key $\mathcal{P}^{priv}$ among n participants $p_i \in \mathcal{P}_{1 \leq i \leq n}$, the dealer computes $p_i$'s (public, private) key pair as $\langle r_i \cdot G \bmod q, r_i \rangle$ such that $r_i = f(i)$, $i \neq 0$. Here, $G \in E/\mathbb{F}_p$ is a base point of order q for elliptic curve E, and $(P)_x$ (resp. $(P)_y$) refers to the x (resp. y) coordinate of point P on curve E. (The modulus that operations are performed under may be omitted where it is apparent from context). The public keys are made available to all participants, while the private keys are distributed securely to each participant (e.g., using the device's public key and ElGamal encryption). All participants are also given access to $(c_j \cdot G)_{0 \leq j \leq t-1}$, which allows them to verify their secret key and the public keys of other participants by checking that:

$$r_i \cdot G = \sum_{j=0}^{t-1} i^j (c_j \cdot G) \bmod p$$

This constitutes a (t, n) verifiable secret sharing (VSS) of the private key $\mathcal{P}^{priv}$, as participants are able to verify the legitimacy of their share with respect to a globally-known public key.

Now, given access to any t shares $\{(i, r_i)\}_{1 \leq i \leq t}$, where $f(\cdot)$ has degree $t-1$ and $t \leq n$, the shares $(i, r_i)$ may be combined through Lagrange polynomial interpolation to evaluate $f(x)$:

$$f(x) = \sum_{i=1}^{t} \left( r_i \cdot \left( \prod_{\substack{j=1 \\ j \neq i}}^{t} \frac{x-x_j}{x_i-x_j} \right) \right) \bmod q$$

This allows any quorum of t participants $p_i \in \bar{\mathcal{P}} \subseteq \mathcal{P}$, $|\bar{\mathcal{P}}| \oplus = t \leq n$ to combine their shares $\{(i, r_i)\}_{1 \leq i \leq t}$ and recover the polynomial's free coefficient $c_0 = f(0)$, which is the master asymmetric private key $\mathcal{P}^{priv}$. Although the Lagrange form is used for the interpolating polynomial, other approaches (e.g., using a monomial basis or the Newton form) may be substituted. Similarly, although the exemplary construction evaluates $f(\cdot)$ rather than recover the coefficients, alternatively the latter may be accomplished using a Vandermonde matrix representation and solving the system of linear equations.

Although elliptic curve cryptography may be used, it will be readily apparent that various other cryptographic frameworks (e.g., ElGamal, RSA, NTRU, etc.) could be employed instead. A number of threshold cryptographic operations can be carried out within this framework, using a variety of methods such as threshold encryption, decryption, and signing, threshold zero knowledge proofs of knowledge, threshold signcryption, and distributed key generation. Other elliptic curve mechanisms such as Massey-Omura, Diffie-Hellman, Menezes-Vanstone, Koyama-Maurer-Okamoto-Vanstone, Ertaul, Demytko, etc. could likewise be employed.

An entity in possession of a device's enrollment information $\{p_i^{pub}, c_i, \text{helper}_i\}$ can thus encrypt a message nt such that the target device is able to recover it, using a method such as ElGamal encryption:

---
ElGamal Encryption for Server s do
    Lookup: challenge $c_i$, generator G, modulus p and Helper $h_i$ for Device $p_i$
    Select $y \in \mathbb{F}_p$ uniformly at random
    Lookup public key $A = p_i^{priv} \cdot G \bmod p$ for Device $p_i$
    Generate shared key: $y \cdot G \bmod p$
    Encrypt message m by computing $m + (yA)_y \bmod q$
    Device $p_i \leftarrow \{yG, m + (yA)_y \bmod q, c_i, G, p, h_i\}$
end for

---

Then, if all participants of a group $\bar{\mathcal{P}} \subseteq \mathcal{P}$, where $|\bar{\mathcal{P}}| \geq t$, $|\mathcal{P}|=n$ and $t \leq n$, wish to decrypt an encryption (yG, m+$(yrG)_z$) of a message $m \in [1, p-1]$ using group private key r, threshold ElGamal decryption (e.g., per Ertaul) can be used as follows:

Each participant $p_i \in \bar{\mathcal{P}}$ uses their secret key $r_i = f(i)$ to compute a shadow:

$$w_i = \left( \prod_{\substack{j=1 \\ j \neq i}}^{t} \frac{-j}{i-j} \right) \cdot r_i \bmod q$$

Each participant then broadcasts their partial decryption $S_i$ defined as $S_i = w_i \cdot yG \bmod q$.

Each participant locally computes the value:

$$S = \sum_{i=1}^{t} S_i \bmod q$$

$$= \left(\sum_{i=1}^{t} w_i\right) \cdot yG$$

$$= r \cdot yG$$

Finally, each participant may now locally recover the message m by computing $(m+(yrG)_y)-S \bmod q = (m+(yrG)_y)-(ryG)_y = m$.

Likewise, a group $\bar{\mathcal{P}} \subseteq \mathcal{P}$ where $|\bar{\mathcal{P}}| \geq t$, $|\mathcal{P}|=n$ and $t \leq n$, can use a threshold signature scheme to generate a signature representing all of $\mathcal{P}$ for message m as follows:

Each participant $p_i \in \bar{\mathcal{P}}$ uses their secret key $r_i = f(i)$ and a random integer $y_i \in \mathbb{F}_q$ to calculate their individual signature $(R_i, S_i)$ for message m.

First, $R_i$ is computed from $y_i \cdot G \bmod p$ and publicized to all participants $p_i \in \bar{\mathcal{P}}$.

Next, each participant $p_i$ calculates R, e, and $S_i$ as follows:

$$R = \sum_{i=1}^{t} R_i \bmod p$$

$$e = h(m, (R)_y \bmod q)$$

$$S_i = y_i + r_i e \left(\prod_{\substack{j=1 \\ j \neq i}}^{t} \frac{-j}{i-j}\right) \bmod q$$

h(·) or H(·) denotes a cryptographic hash function.

Each participant broadcasts $S_i$ to an appointed secretary (for convenience, and who need not be trusted).

The secretary, having received all $(R_i, S_i)$ pairs, verifies the signature by computing:

$$R = \sum_{i=1}^{t} R_i \bmod p$$

$$e = h(m, (R)_y \bmod q)$$

$$R_i = S_i \cdot G + e \left(\prod_{\substack{j=1 \\ j \neq i}}^{t} \frac{-j}{i-j}\right)(-p_i^{pub}) \bmod p$$

If constructed properly, this equation will hold as:

$$R_i \stackrel{?}{=} S_i \cdot G + e \left(\prod_{\substack{j=1 \\ j \neq i}}^{t} \frac{-j}{i-j}\right)(-p_i^{pub}) \bmod p$$

$$= \left(y_i + r_i e \left(\prod_{\substack{j=1 \\ j \neq i}}^{t} \frac{-j}{i-j}\right)\right) \cdot G + e \left(\prod_{\substack{j=1 \\ j \neq i}}^{t} \frac{-j}{i-j}\right)(-r_i G)$$

$$= y_i G + e r_i G \left(\prod_{\substack{j=1 \\ j \neq i}}^{t} \frac{-j}{i-j}\right) + e(-r_i G)\left(\prod_{\substack{j=1 \\ j \neq i}}^{t} \frac{-j}{i-j}\right)$$

$$= y_i G + (e r_i G - e r_i G)\left(\prod_{\substack{j=1 \\ j \neq i}}^{t} \frac{-j}{i-j}\right)$$

$$= y_i G$$

$$:= R_i$$

If these hold, the secretary calculates:

$$S = \sum_{i=1}^{t} S_i \bmod q$$

which computes the group signature $((R)_y \bmod q, S)$ over m.

Upon receipt of $(R, S)$, receiver $p_R$ checks its validity against the public key $\mathcal{P}^{pub}$ of the entire group of participants $p_i \in \mathcal{P}_{1 \leq i \leq n}$;

$$e \stackrel{?}{=} h(m, (S \cdot G + r \cdot -\mathcal{P}^{pub})_y \bmod q)$$

which holds on valid signatures because:

$$e \stackrel{?}{=} h(m, (S \cdot G + e \cdot -\mathcal{P}^{pub})_y \bmod q)$$

$$= h(m, ((y + re) \cdot G + e \cdot (-rG))_y)$$

$$= h(m, (yG + erG - erG)_y)$$

$$= h(m, (yG)_y)$$

$$= h(m, (R)_y \bmod q)$$

The participants of a group $\bar{\mathcal{P}} \subseteq \mathcal{P}$ where $\bar{\mathcal{P}} \geq t$, $|\bar{\mathcal{P}}|=n$ and $t \leq n$ can also collaborate to demonstrate possession of a shared private key $\mathcal{P}^{priv}=r \in [1, q-1]$ using a threshold Zero Knowledge Proof of Knowledge (e.g., Sardar et al., "Zero Knowledge Proof in Secret Sharing Scheme Using Elliptic Curve Cryptography," *Global Trends in Computing and Communication Systems*, volume 269 of *Communications in Computer and Information Science*, pages 220-226, Springer, 2012) as follows:

The group public key is $\mathcal{P}^{pub}=rG$, where r is a shared secret and G is a group generator. The verifier v chooses an ephemeral nonce N and distributes this to all participants of $\bar{\mathcal{P}}$.

Each participant $p_i \in \bar{\mathcal{P}}$ uses their secret share $r_i = f(i)$ and a random nonce integer $y_i$ to calculate their individual proof $(B_i, M_i)$ of the shared secret r.

First, $B_i$ is computed and publicized to all participants $p_i \in \bar{\mathcal{P}}$:

$$B_i = y_i \cdot G \bmod p$$

Each participant locally computes:

$$B = y \cdot G = \sum_{i=1}^{t} B_i \bmod p$$

Next, each participant $p_i$ calculates e, $M_i$ as follows:

$$e = h(G, B, \mathcal{P}^{pub}, N)$$

$$M_i = y_i + r_i e \left( \prod_{\substack{j=1 \\ j \neq i}}^{t} \frac{-j}{i-j} \right) \bmod q$$

Upon receipt of $(B_i, M_i)_{1 \leq i \leq t}$, the verifier $v$ computes:

$$B = \sum_{i=1}^{t} B_i \bmod p$$

$$M = \sum_{i=1}^{t} M_i \bmod q$$

$$e = h(G, B, \mathcal{P}^{pub}, N)$$

Next, the verifier checks the proofs validity against the public key $\mathcal{P}^{pub} = rG$.

$$B \stackrel{?}{=} M \cdot G - e \cdot \mathcal{P}^{pub} \bmod p$$
$$= (y + re) \cdot G - e \cdot (rG)$$
$$= yG + reG - reG$$
$$= yG$$

If $B = M \cdot G - e \cdot \mathcal{P}^{pub}$, the verifier $v$ accepts the threshold zero knowledge proof as valid, and rejects the proof otherwise.

The process of signcrypting (e.g., Changgen et al., "Threshold Signcryption Scheme based on Elliptic Curve Cryptosystem and Verifiable Secret Sharing," *International Conference on Wireless Communications, Networking and Mobile Computing*, volume 2, pages 1182-1185, 2005; Zheng, "Digital Signcryption or How to Achieve Cost (Signature & Encryption)«Cost(Signature)+Cost(Encryption)," *Advances in Cryptology, CRYPTO '97*, volume 1294 of *Lecture Notes in Computer Science*, pages 165-179, Springer, 1997; Zheng et al., "How to Construct Efficient Signcryption Schemes on Elliptic Curves," *Inf. Process. Lett.*, volume 68, no. 5:227-233, 1998) a message facilitates performing both signing and encrypting a message at a cost less than computing each separately. Given a message $m \in [1, q-1]$ and a receiver $p_R$ with public key $p_R^{pub}$, signcryption can be generated as follows:

Each $p_i \in \mathcal{P}$ selects a random $k_i \in [1, q-1]$ and computes $Y_i = k_i \cdot G$ and publicly broadcasts this to both a secretary (for convenience, and who need not be trusted) and the receiver $p_R$. Each $p_i \in \mathcal{P}$ also computes $Z_i = k_i \cdot p_R^{pub}$ which is privately (for example, using ElGamal encryption) sent to $p_R$.

The secretary computes:

$$Z = \sum_{i=1}^{t} Z_i = \sum_{i=1}^{t} k_i \cdot p_R^{pub} = k \cdot p_R^{pub}$$

$$r = m \cdot (Z)_x \bmod p$$

and broadcasts r (not to be confused with $r_i$, participant $p_i$'s share of $\mathcal{P}^{priv}$) to each signer $p_{1 \leq i \leq t}$.

Each signer $p_{1 \leq i \leq t}$ computes:

$$x_i = \prod_{\substack{j=1 \\ j \neq i}}^{t} \frac{-j}{i-j} \bmod q$$

$$e_i = r_i \cdot x_i \bmod q$$

$$s_i = k_i - e_i \cdot r \bmod q$$

where $r_i = f(i)$ is $p_i$'s share of $\mathcal{P}^{priv}$. Each signer sends their partial signcryption $s_i$ to the secretary.

Upon receipt of a partial signcryption $s_i$, the secretary computes $Y'_i = r \cdot x_i \cdot p_i^{pub} + s_i \cdot G$ in order to verify the validity of the partial signcryption by checking $Y_i \stackrel{?}{=} Y'_i$.

Upon receipt of all partial signcryptions $s_i$ and checking their validity, the secretary combines them to compute:

$$s = \sum_{i=1}^{t} s_i \bmod q$$

and (r, s) is the final signcryption sent to receiver $p_R$.

The receiving participant $p_R$, which has now received $\langle \{Y_i = k_i \cdot G\}_{i \in [1 \ldots n]}, (r, s) \rangle$, computes:

$$Y = \sum_{i=1}^{t} Y_i = \sum_{i=1}^{t} (k_i \cdot G) = k \cdot G$$

$$Y' = r \cdot \mathcal{P}^{pub} + s \cdot G$$

$$Z' = p_R^{priv} \cdot Y'$$

The recipient $p_R$ then verifies that:

$$Y' \stackrel{?}{=} r \cdot \mathcal{P}^{pub} + s \cdot G$$

$$= r \cdot \mathcal{P}^{pub} + \sum_{i=1}^{t} s_i \cdot G$$

$$= r \cdot \mathcal{P}^{pub} + G \cdot \sum_{i=1}^{t} (k_i - e_i \cdot r)$$

$$= r \cdot \mathcal{P}^{pub} + \left( G \cdot \sum_{i=1}^{t} k_i \right) - \left( G \cdot \sum_{i=1}^{t} e_i \cdot r \right)$$

$$= r \cdot \mathcal{P}^{pub} + k \cdot G - r \cdot G \cdot \sum_{i=1}^{t} e_i$$

$$= r \cdot \mathcal{P}^{pub} + k \cdot G - r \cdot G \cdot \left( \sum_{i=1}^{t} r_i \cdot \left( \prod_{\substack{j=1 \\ j \neq i}}^{t} \frac{-j}{i-j} \right) \right)$$

$$= r \cdot \mathcal{P}^{pub} + k \cdot G - r \cdot G \cdot (f(0))$$

$$= r \cdot \mathcal{P}^{priv} \cdot G + k \cdot G - r \cdot G \cdot \mathcal{P}^{priv}$$

$$= k \cdot G = Y$$

If these hold, the group signature over m, is valid.

The recipient $p_R$ can now recover the message m, by computing:

$$r \cdot (Z')_x^{-1} = (m \cdot (Z)_x) \cdot (Z')_x^{-1}$$
$$= (m \cdot (k \cdot p_R^{pub})_x) \cdot (p_R^{priv} \cdot Y')_x^{-1}$$
$$= (m \cdot (k \cdot (p_R^{priv} \cdot G))_x) \cdot (p_R^{priv} \cdot (k \cdot G))_x^{-1}$$
$$= m$$

With this, the recipient $p_R$ has both verified the group's signature over message m, as well as decrypted m.

Distributed Key Generation

Standard threshold cryptographic operations (e.g., those discussed above) traditionally use a trusted dealer $\mathcal{D}$ to define a generating polynomial $f(\bullet)$, select a secret r, and distribute shares of r to all participants $p_i \in \mathcal{P}$. Distributed key generation protocols remove the necessity of a trusted dealer, and allow a set of participants $\mathcal{P}$ to generate shares of a secret where no one knows the shared secret r. According to one embodiment, this can be accomplished in the present context as follows:

Each participant $p_i \in \mathcal{P}$ defines a random polynomial $f_i(\bullet)$ of degree t−1, where t is the threshold. The temporary private value of participant $p_i$ is $c_0^{(i)}$, the free coefficient of $f_i(\bullet)$.

Each participant $p_i \in \mathcal{P}$ privately sends $f_i(j)$ to participant $p_j$, $\forall j \in [1, \ldots, n]/i$.

Participant $p_i$ broadcasts $\{c_k^{(i)} \cdot G \bmod p\}_{k \in [0, \ldots, t-1]}$, commitments to the coefficients of $f_i(\bullet)$.

Participant $p_i$ broadcasts $\{f_i(j) \cdot G \bmod p\}_{j \in [0, \ldots, n]}$, the public shares for all participants.

Each participant $p_{j \neq i} \in \mathcal{P}$ must now verify the shares they have received.

First, each participant $p_{j \neq i}$ verifies that:

$$f_i(j) \cdot G \stackrel{?}{=} \sum_{k=0}^{t-1} j^k (c_k^{(i)} \cdot G) \bmod p$$
$$= G \cdot \left( \sum_{k=0}^{t-1} j^k c_k^{(i)} \right)$$
$$= G \cdot f_i(j)$$

Similarly, each participant $p_{j \neq i} \in \mathcal{P}$ verifies that their share is consistent with other shares:

$$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$
$$= G \cdot \sum_{i=1}^{t} \left( \left( \prod_{\substack{j=1 \\ j \neq i}}^{t} \frac{-j}{i-j} \right) f_i(j) \right)$$
$$= G \cdot c_0^{(i)}$$

If these two verifications succeed, each participant $p_i \in \mathcal{P}$ computes its share of the master asymmetric private key r:

$$r_i = \sum_{j=1}^{n} f_j(i) \bmod q$$

Similarly, the master asymmetric public key for the group is computed as:

$$r \cdot G = \sum_{j=1}^{n} \sum_{i=1}^{n} (f_j(i) \cdot G) \bmod p$$

The distributed key generation protocol is preferably secure again an adversary that attempts to bias the output distribution, as in the attack described by Gennaro et al, "Secure Distributed Key Generation for Discrete-Log Based Cryptosystems." Similarly, threshold constructions are preferably secure against both static as well as adaptive malicious adversaries.

PUF-Enabled Threshold Cryptography

The core functionality of a PUF is extracting a unique mapping between the challenge (input) domain and the response (output) range. As the mapping from challenges to responses is unique for each PUF-enabled device, collecting a set of challenge-response pairs (CRPs) through a provisioning process allows the device to be verified in the future. Protocol 1 illustrates the naïve provisioning process that underlies many PUF-enabled protocols.

| Protocol 1 Challenge-Response Provisioning | |
|---|---|
| PUF Device D | Server s |
| | ← challenge c ∈ {0, 1}$^{\kappa_1}$ |
| P(c) ↦ r ∈ {0, 1}$^{\kappa_2}$ | → store(D, {c, r}) |

Authentication proceeds by issuing a challenge for which the response is known to the server, and verifying that the response is t-close to the expected response. However, this lightweight nave protocol has many limitations. During enrollment, a large number of challenge-response pairs must be collected, as each pair can only be used once for authentication. If an adversary observed the response, it could masquerade as the device. Similarly, the challenge-response database is sensitive, as an adversary could apply machine learning to fully characterize the PUF mapping "Modeling Attacks on Physical Unclonable Functions". These issues can be eliminated by applying cryptographic constructs around the PUF functionality.

In the example of an embodiment employing elliptic curve cryptography, Algorithms 1 and 2 below can be used to allow a PUF-enabled device to locally store and retrieve a sensitive value without needing to store any sensitive information in non-volatile memory. Algorithm 1 illustrates the storing of a sensitive value $v_i$ using a PUF, and Algorithm 2 illustrates the dynamic regeneration of $v_i$. The challenge $c_i$ and helper data helper, can be public, as neither reveals anything about the sensitive value $v$. While the present example uses encryption of $v_i$ by exclusive-or, ⊕, $v_i$ could also be used as a key to other encryption algorithms (e.g., AES) to enable storage and retrieval of arbitrarily sized values.

| Algorithm 1 PUF-Store |
|---|
| Goal: Store value $v_i$ |
| for PUF Device d do |
|     Select finite field $\mathbb{F}_n$ of order n |
|     Select E, an elliptic curve over $\mathbb{F}_n$ |

Algorithm 1 PUF-Store

```
Find G ∈ E/F_n, a group generator
Select challenge c_i ∈ F_n
x = H(c_i, E, G, n)
O = PUF(x)
helper_i = P_i = O ⊕ ECC(V_i)
Write {c_i, helper_i} to non-volatile memory
end for
```

Algorithm 2 PUF-Retrieve

```
Goal: Retrieve value V_i
for PUF Device d do
    Read {c_i, helper_i} from non-volatile memory
    x ← H(c_i, E, G, n)
    O' = PUF(x)
    V_i ← D((ECC(V_i) ⊕ O) ⊕ O')
end for
```

Whenever O and O' are t-close, the error correcting code ECC can be passed to a decoding algorithm D to recover the sensitive value $v_i$.

Using Algorithm 3, a local device can perform an enrollment protocol using the PUF. This allows each PUF circuit to generate a local public key $p_i^{pub}$, which is useful for bootstrapping more complex key setup algorithms (e.g., the distributed key generation protocol in Algorithm 4). When the key setup algorithm is performed internal to the device (rather than externally among a set of distinct devices), this bootstrap process may not be necessary.

Algorithm 3 Enrollment

```
for Device d do
    c_i ∈ F_p, a group element
    x = H(c_i, E, G, p, q)
    O = PUF(x)
    helper_i = O ⊕ ECC(p_i^priv mod q)
    p_i^pub = A_i = p_i^priv · G mod p
    Store {p_i^pub, c_i, helper_i}
end for
```

Next, PUF-based cryptographic primitives are adapted to secret sharing to permit threshold cryptography founded on PUF or other root of trust. Using the example of an embodiment employing elliptic curve cryptography, distributed key generation is used to generate a number of shares (for example, two: $r_1$, $r_2$) of a master private key $\mathcal{P}^{priv}=(r_1+r_2)$ mod q), which itself does not need to be generated or constructed at any time during the protocol. The protocol is summarized in Algorithm 4: PUF-DKG, where in an example implementation, (t, n) is chosen as (2, 2).

Algorithm 4 PUF-DKG

```
Goal: Generate shares of master private key P^priv
for 1 ≤ i ≤ n do
    Select random polynomial f_i(·) = c_0^(i) + ... + c_{t-1}^(i) x^{t-1} mod q
    Compute f_i(j), ∀j ∈ [1, ..., n]/i
    Store coefficient commitments {c_k^(i) · G mod p}_{k∈[0, ..., t-1]}
    Store share commitments {f_i(j) · G mod p}_{j∈[0, ..., n]}
    for 1 ≤ i ≤ n do
```

Algorithm 4 PUF-DKG

Verify $$f_i(j) \cdot G \stackrel{?}{=} \sum_{k=0}^{t-1} j^k (c_k^{(i)} \cdot G) \bmod p$$

Verify $$c_0^{(i)} \cdot G \stackrel{?}{=} \sum_{i=1}^{t} \left( \left( \prod_{\substack{j=1 \\ j \neq i}}^{t} \frac{-j}{i-j} \right) f_i(j) \cdot G \right) \bmod p$$

end for
Recover share $$r_i = \sum_{j=1}^{n} \left( \left( \prod_{\substack{j=1 \\ j \neq i}}^{t} \frac{-j}{i-j} \right) f_j(i) \right) \bmod q$$

Recover public key $$\mathcal{P}^{pub} = r \cdot G = \sum_{j=1}^{n} \sum_{i=1}^{n} \left( \left( \left( \prod_{\substack{j=1 \\ j \neq i}}^{t} \frac{-j}{i-j} \right) f_j(i) \right) \cdot G \right) \bmod p$$

end for

Using Algorithms 1 and 2 for storing and retrieving a sensitive value, and Algorithm 4 for performing the initial distributed key generation protocol, arbitrary PUF-enabled threshold cryptographic operations (e.g., decryption, digital signatures, zero knowledge proofs) can be performed. Algorithm 5 describes how to evaluate an arbitrary threshold cryptographic operation $\mathcal{O}$ that requires as input a participant's share $r_i$. Note that the recovered share $r_i$ has already been multiplied by the Lagrange terms $$\left( \prod_{j=1, j \neq i}^{t} \frac{-j}{i-j} \right).$$

Algorithm 5 PUF-Threshold-OP

```
Goal: Perform threshold operation O
Assume: PUF-DKG (Algorithm 4) has been executed by PUF Device d
for Server s do
    Issue Command O and Auxiliary Information Aux
end for
for PUF Device d do
    for each challenge c_i (Challenge c = c_0 || ... ||c_n) do
        Read challenge c_i and helper data h_i
        Recover share r_i ← PUF-Retrieve(c_i, h_i)
        Perform threshold operation O(r_i, Aux)
    end for
    Combine threshold operations O ← Combine({O(r_i, Aux)}_{0≤i≤n})
    return Result O
end for
for Server s do
    Process operation O
end for
```

This enables any threshold cryptographic operation (e.g., decryption, digital signature generation, zero knowledge proofs) to be performed by a PUF-enabled participant without having to generate, reconstruct, or store their private key. Further, from an external perspective (e.g., the server), the PUF-enabled device simply implements standard public key cryptographic protocols. That is, the server does not have to issue a challenge or store helper data, and its interaction with the device is indistinguishable from any standard public key cryptography device. Although threshold cryptography typically considers distributing operations across physically-distinct nodes, in one embodiment of the present invention, threshold cryptography may be applied within a single device. By internalizing the challenge-response functionality of the PUF, and utilizing Algorithms 1 and 2 to locally store and recover a value (e.g., a cryptographic key), arbitrary (e.g., symmetric or asymmetric) cryptographic operations can be performed without need for issuing or storing auxiliary (e.g., challenges or helper data) information.

As an example, a device may be equipped, e.g., with two PUF circuits (e.g., ring oscillator, arbiter, SRAM) and provided with the ability to execute at least two instructions at the same time (e.g., through multiple CPU cores). One embodiment of such a device may comprise a XILINX ARTIX 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the device's external input and output and to perform algorithms (sending elliptic curve and other mathematical calculations to the math engine) such as those described above. The FPGA may have one or more PUF circuits implemented in separate areas of the FPGA fabric. Simultaneous execution may be accomplished by instantiating multiple software CPUs, e.g., a MICROBLAZE processor. (It is noted that where it is stated herein that the 'device' performs an action, it is implicit that such action is or may be carried out by an appropriately-configured processor in the device unless something different is apparent from the context. It is further intended that the word 'processor' is inclusive of multiple discrete processors together performing recited actions, processors with multiple cores, etc.).

As a further example, a device may be equipped, e.g., with a block of phase change memory (PCM), dynamic random access memory (DRAM), or other memory that may be physically reconfigured. One embodiment of such a device may comprise an application-specific integrated circuit (ASIC) configured to interact with the DRAM block. Another embodiment of such a device may comprise a system on a chip (SoC) configured to interact with the DRAM block. Yet another embodiment of such a device may be a generic CPU configured to interact with the DRAM block.

Figure 2:
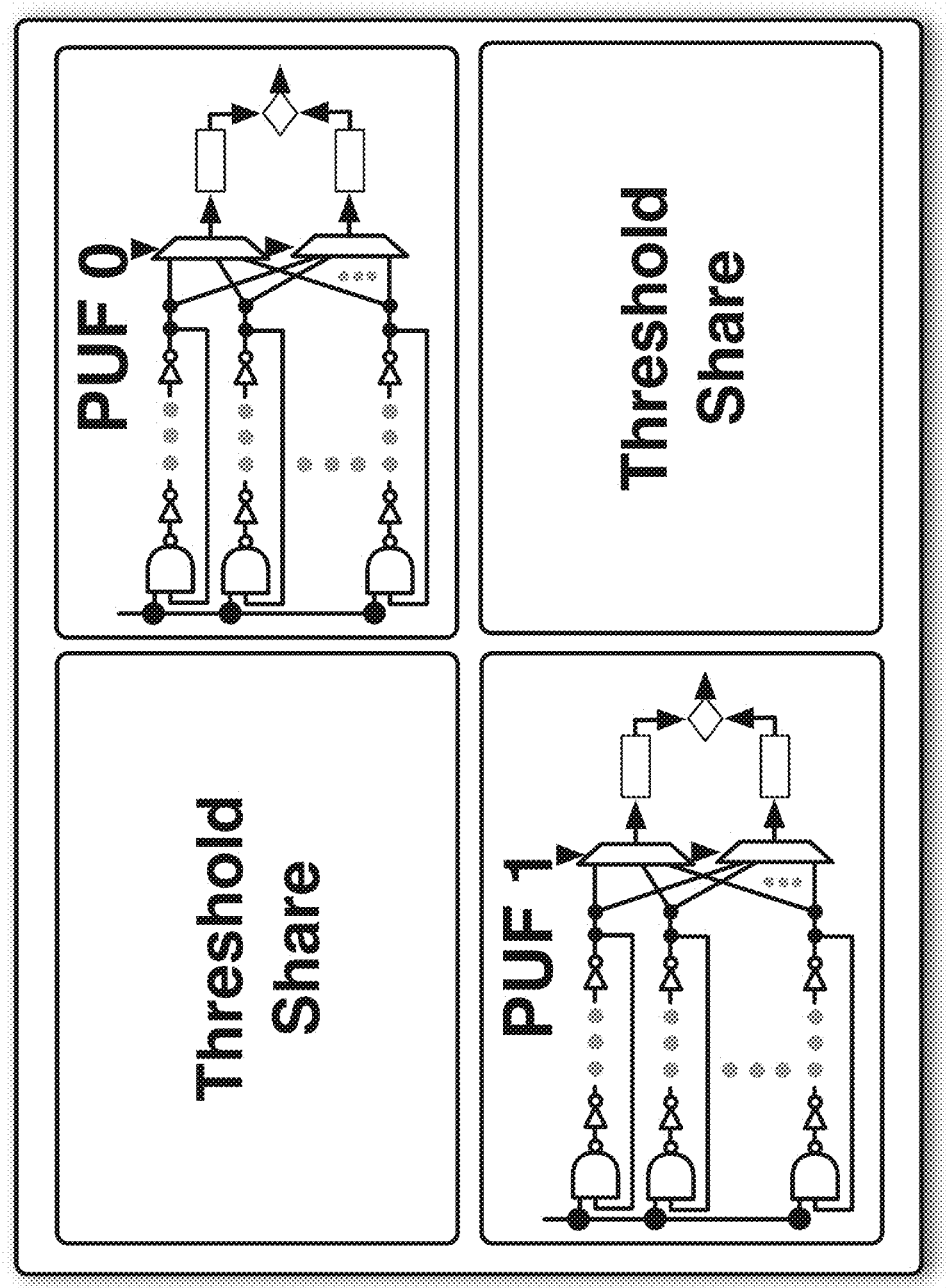
FIG. 2 is a functional diagram of a device having dual PUF circuits.

An embodiment of the present invention with only one PUF circuit can execute operations over each share sequentially, rather than querying the multiple PUF circuits in parallel. FIG. 2 illustrates a device equipped with two PUF circuits to enable local threshold cryptographic operations; the device may be, for example, an FPGA with a separate core containing each PUF. The potentially extractable output of a single PUF may then be obviated by constructing a local (2, 2) threshold system with each of the parts $p_i$ acting as a distinct participant. For example, each part may select a random challenge, run the enrollment algorithm (Algorithm 3) to generate an asymmetric key pair $\langle p_i^{pub} = p_i^{priv} \rangle$ and locally store its public enrollment information and then together run the distributed key generation protocol (Algorithm 4) and perform all cryptographic operations over a private key that may never actually be constructed. When threshold cryptography is applied within a single device, it may not be necessary to run the enrollment algorithm (Algorithm 3) to generate an asymmetric key pair as all computations are performed internal to the device.

Algorithm 6 describes how a dual-PUF device can compute cryptographic operations in a threshold manner by constructing a (2, 2) threshold sharing within the device using distributed key generation. That is, the two parts establish a private key known to neither part through distributed key generation and publicize the corresponding public key $\mathcal{P}^{pub}$. All operations targeted at the device are now performed in a threshold manner through internal collaboration (with each part retrieving its share $r_i$ and performing a local threshold operation, and the results are combined to complete a threshold operation $\mathcal{O}$, while the input/output behavior of the device remains unchanged to external systems.

---

Algorithm 6 Dual-PUF-Threshold-OP

---

Goal: Perform threshold operation $\mathcal{O}$ at time $\tau$
One-Time Setup Stage for each PUF Core $p_i \in \mathcal{P}$ do
   Run Algorithm 3: Enrollment, Publicize $p_i^{pub}$
end for
Run (2, 2)-PUF-DKG, Publicize $\mathcal{P}^{pub}$
Evaluation Stage for each PUF Core $p_i \in \mathcal{P}$ do
   Recover share $r_i^{(\tau)} \leftarrow$ PUF-Retrieve($c_i^{(\tau)}$, helper$_i^{(\tau)}$)
   $p_i^{(\mathcal{O})} \leftarrow \mathcal{O}(r_i^{(\tau)})$, PUF core local threshold share
end for
return $\mathcal{O} \leftarrow$ Combine($\{p_0^{(\mathcal{O})}, p_i^{(\mathcal{O})}\}$)

---

Thus, rather than being constrained to a mapping between a challenge issued to the device and its response (which to an extent may be a function of the challenge), a multi-PUF device $d_i$ can have a single static external identity, $p_i^{pub}$. The challenge-response functionality of each PUF core is used to maintain each share of the device's private identity, $p_i^{priv}$, which does not need to be generated or constructed. Each part retrieves its share $r_i^{(\tau)}$ and performs a local threshold operation, and the shares are combined to complete the operation $\mathcal{O}$.

Figure 3:
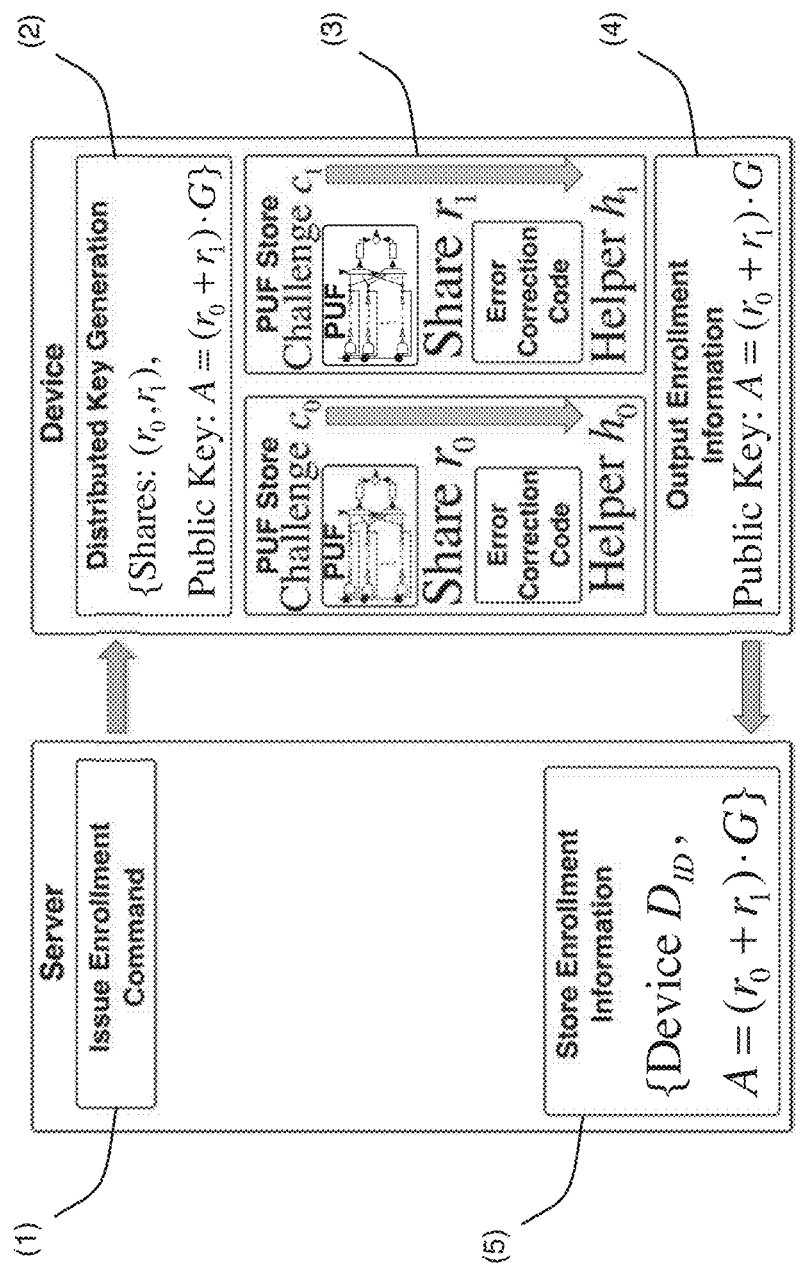
FIG. 3 is an operational flowchart of enrollment of a device like that of FIG. 2 in an embodiment of the invention.
Figure 4:
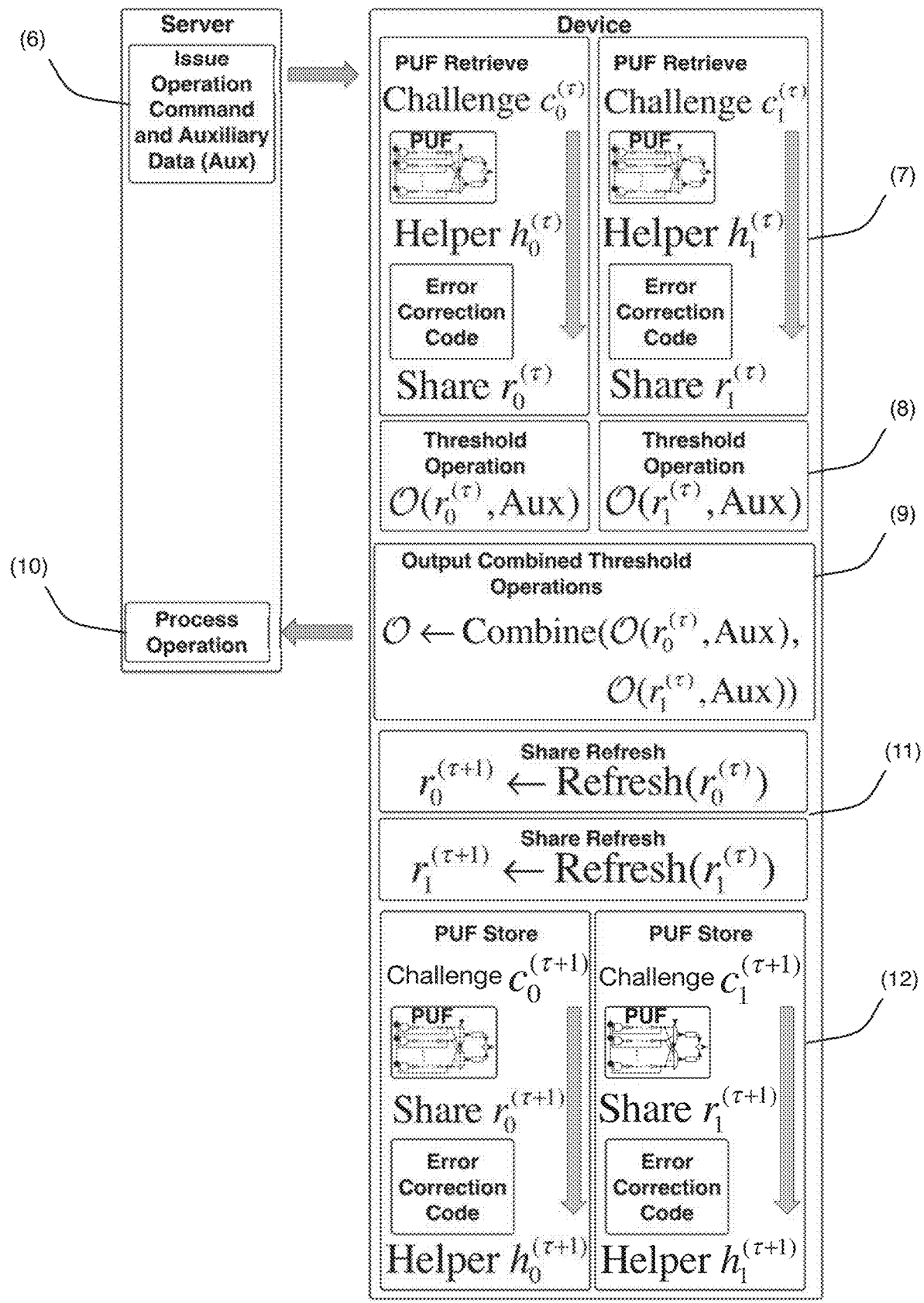
FIG. 4 is an operational flowchart of threshold cryptographic operations in a device like that of FIG. 2 in an embodiment of the invention.

Referring to FIG. 3 and FIG. 4, the operations of an example embodiment employing elliptic curve cryptography, division of a key into two shares, and a (2, 2) threshold operation, are described, via example implementation.

Enrollment Command 1: During the initial enrollment process, the server and device agree on an elliptic curve E defined over a finite field $\mathbb{F}_p$ and base point G of order q, where p is λ bits long. The server issues the enrollment command to the device.

Distributed Key Generation 2: The device performs a distributed key generation locally, creating shares ($r_0$, $r_1$) of the master private key (which is never generated or constructed) and its public key $A = (r_0 + r_1) \cdot G$. Rather than directly add the shares together (which would construct the private key $r = r_0 + r_1$), the public key is formed by computing $(r_0 \cdot G) + (r_1 \cdot G)$.

Helper Data Generation 3: The device generates a random challenge $c = c_0 \| c_1$ where $\|$ denotes concatenation and each $c_i$ block is $\lambda$ bits long. The device links each share $r_i$ to the output $O_i$ of the PUF on challenge $c_i$ through fuzzy extraction, which outputs a public helper $h_i$. As the PUF output $O_i$ is noisy, there is no guarantee that when queried on challenge $c_i$ in the future, the new output $O'_i$ will satisfy $O'_i = O_i$. However, it is assumed that $O_i$ and $O'_i$ will be t-close with respect to some distance metric (e.g. Hamming distance). Thus, an error correcting code may be applied to the PUF output such that at most t errors will still recover $O_i$. Error correction may be applied over each share $r_i$, and this value blinded with the output of the PUF $O_i$ on challenge $c_i$, so that each helper value $h_i = ECC(r_i) \oplus O_i$ reveals no information about share $r_i$. During recovery through fuzzy extraction, computing the exclusive-or of ECC $(r_i) \oplus O_i \oplus O'_i$ will return $r_i$ whenever $O_i$ and $O'_i$ are t-close. The device locally stores the challenge $c = c_0 \| c_1$ and helper data $h = h_0 \| h_1$, which will allow it to later recover the shares. Note that both the challenge and the helper data are public, and reveal nothing about the shares or the device's private key without invoking the PUF. This process is described by Algorithm 1.

Returned Public Key 4: The device returns its public enrollment information $\{A = (r_0 + r_1) \cdot G\}$ to the server.

Store Enrollment 5: The server stores the device's public enrollment information along with a (non-sensitive) identifier that is unique to the device (e.g., a serial number).

Threshold Operation Query 6: When the server wishes the device to perform a cryptographic operation (e.g., decryption, digital signature generation, zero knowledge proof authentication), it issues:
  the appropriate command for the operation to be performed
  any auxiliary data Aux for the operation (e.g., ciphertext to be decrypted, a message to be signed)

PUF Retrieval 7: The device reads the challenge $c = c_0 \| c_1$ and helper data $h = h_0 \| h_1$ from its local storage. The device then queries the PUF on each challenge block $c_i$, and combines the output $O'_i$ with the helper block $h_i$ and error correcting code to recover each share block $r_i$. This process is described by Algorithm 2.

Threshold Operation 8: The device performs a threshold operation $\mathcal{O}(r_i, Aux)$ over each share $T_i$. Algorithm 5 describes this process for any arbitrary threshold operation $\mathcal{O}$.

Combined Threshold Operations 9: The device combines the threshold operations to form the complete operation $\mathcal{O}$ and returns the result to the server.

Process Operation 10: The server finally performs any additional processing required for the operation (e.g., verifying a zero knowledge proof).

Share Refreshing

Various share refresh protocols allow each of a set of players $p_i \in \mathcal{P}$ to refresh their share $r_i^{(\tau)}$ of an original secret r at time period T into a new share $r_i^{(\tau+1)}$ such that the resulting set of new shares $\{r_i^{(\tau+1)}\}_{i \in [1 \ldots n]}$ remains a sharing of the original secret. This protocol does not require reconstruction of the master secret r, so a mobile adversary would have to compromise t players in a fixed time period $\tau$ in order to recover the shared secret. Assuming a polynomial $f(\cdot)$ of degree $(t-1)$ represents a shared secret $r = f(0)$ amongst n participants each having a share $r_i = f(i)$, and denoting encrypting for player $p_j$ as $ENC_j(\cdot)$ and decryption by $p_j$ as $DEC_j(\cdot)$, the set of players $p_i \in \mathcal{P}$ can refresh their sharing of r using such a protocol as follows:

Each player $p_i$ defines a new polynomial of degree (t−1) such that $\delta_i(0) = 0$:

$$\delta_i(\cdot) = \Delta_1^{(i)} x + \ldots + \Delta_m^{(i)} x^{t-1}$$

where the set $\{\Delta_m^{(i)}\}_{m \in [1 \ldots t-1]}$ is chosen randomly from $\mathbb{Z}$.

Each player $p_i$ computes the following sets:

$$\{\epsilon_{im} = \Delta_m^{(i)} \cdot G\}_{m \in [1 \ldots t-1]}$$

$$\{u_{ij} = \delta_i(j)\}_{j \in [1 \ldots n]}$$

$$\{e_{ij} = ENC_j(u_{ij})\}_{j \in [1 \ldots n]}$$

and broadcasts a verifiable secret sharing $VSS_i^{(\tau)} = \langle i, \tau, \{\epsilon_{im}\}, \{e_{ij}\}\rangle$ and their signature $SIG_i(VSS_i^{(\tau)})$.

ach player $p_i$ recovers $u_{ji} = DEC_i(ENC_i(u_{ji}))$ and verifies $\forall j \neq i$:

$$u_{ji} \cdot G \stackrel{?}{=} \sum_{k=1}^{t-1} j^k \epsilon_{jk}$$

$$= \sum_{k=1}^{t-1} (j^k \Delta_k^{(j)} \cdot G)$$

$$= G \cdot \sum_{k=1}^{t-1} j^k \Delta_k^{(j)}$$

$$= G \cdot \delta_j(i) = G \cdot u_{ji}$$

Finally, each player $p_i$ updates their share from time period ($\tau$) as:

$$r_i^{(\tau+1)} \leftarrow r_i^{(\tau)} + \left(\sum_{j=1}^n u_{ji} \bmod q\right)$$

Thus, the refreshed set of shares $\{r_i^{(\tau+1)}\}_{i \in [1 \ldots n]}$ remains a sharing of the master private key $\mathcal{P}^{priv}$, and yet knowledge of t−1 or fewer shares from time period $\tau$ is useless in time period $\tau+1$.

As outlined in Algorithm 7, participants can update their share $r_i^{(\tau)}$ in time period $\tau$ to a new share $r_i^{(\tau+1)}$ in the next time period such that the set of shares $\{r_i\}_{i \in [1 \ldots n]}$ remains a sharing of the master private key $\mathcal{P}^{priv}$.

---

Algorithm 7 PUF-Share-Update

Goal: Generate new share $r_i^{(\tau+1)}$
for all Participants $p_i \in \mathcal{P}$ do
  Recover share $r_i^{(\tau)}$
    $r_i^{(\tau)} \leftarrow$ PUF-Retrieve($c_i^{(\tau)}$, helper$_i^{(\tau)}$)
  Select random polynomial of degree (t − 1) such that $\delta_i(0) = 0$:
    $\delta_i(\cdot) = \Delta_1^{(i)} x + \ldots + \Delta_m^{(i)} x^{t-1}$
  Compute
    $\{\epsilon_{im} = \Delta_m^{(i)} \cdot G\}_{m \in [1 \ldots t-1]}$
    $\{u_{ij} = \delta_i(j)\}_{j \in [1 \ldots n]}$
    $\{e_{ij} = ENC_j(u_{ij})\}_{j \in [1 \ldots n]}$
  Broadcast
    $VSS_i^{(\tau)} = \langle i, \tau, \{\epsilon_{im}\}, \{e_{ij}\}\rangle$,
    $SIG_i(VSS_i^{(\tau)})$
  Verify $\forall j \neq i$ $$DEC_i(ENC_i(u_{ji})) \cdot G \stackrel{?}{=} \sum_{k=1}^{t} j^k \epsilon_{jk}$$

Update share as:

$$r_i^{(\tau+1)} \leftarrow r_i^{(\tau)} + \left(\sum_{j=1}^n u_{ji} \bmod q\right)$$

| Algorithm 7 PUF-Share-Update |
| --- |
| Store $r_i^{(\tau+1)}$ and update PUF challenge:<br>　　　　$\{c_i^{(\tau+1)}, helper_i^{(\tau+1)}\} \leftarrow$ PUF-Store$(r_i^{(\tau+1)})$<br>end for |

The hardware device performs Algorithm 7 at Share Refresh 11 in FIG. 4 to generate new shares $r_i^{(\tau+1)}$ for the next time period $\tau+1$. At PUF Refresh and Store 12, the hardware device generates a new challenge $c_i^{(\tau+1)}$, which will refresh the challenge-helper pair for the next time period. The hardware device uses the new challenge to store the updated share $r_i^{(\tau+1)}$. Algorithms 5 and 6 are modified to refresh both the threshold shares as well as the challenge-helper pair, with Algorithms 8 and 9, respectively, reflecting the modifications.

| Algorithm 8 PUF-Threshold-OP-Refreshing |
| --- |
| Goal: Perform threshold operation $\mathcal{O}$<br>Assume: PUF-DKG (Algorithm 4) has been executed by PUF Device d<br>for Server s do<br>　Issue Command $\mathcal{O}$ and Auxiliary Information Aux<br>end for<br>for PUF Device d do<br>　for each challenge $c_i$ (Challenge $c = c_0 \| \ldots \| c_n$) do<br>　　Read challenge $c_i$ and helper data $h_i$<br>　　Recover share $r_i \leftarrow$ PUF-Retrieve$(c_i, h_i)$<br>　　Perform threshold operation $\mathcal{O}(r_i, Aux)$<br>　end for<br>　Combine threshold operations $\mathcal{O} \leftarrow$ Combine$(\{\mathcal{O}(r_i, Aux)\}_{0 \leq i \leq n})$<br>　return Result $\mathcal{O}$<br>　for each share $r_i$ do<br>　　Update share<br>　　　　$r_i^{(\tau+1)} \leftarrow$ PUF-Share-Update$(r_i^{(\tau)})$<br>　　Store $r_i^{(\tau+1)}$ and update PUF challenge:<br>　　　　$\{c_i^{(\tau+1)}, helper_i^{(\tau+1)}\} \leftarrow$ PUF-Store$(r_i^{(\tau+1)})$<br>　end for<br>end for<br>for Server s do<br>　Process operation $\mathcal{O}$<br>end for |

| Algorithm 9 Dual-PUF-Threshold-OP-Refreshing |
| --- |
| Goal: Perform threshold operation $\mathcal{O}$ at time $\tau$<br>One-Time Setup Stage<br><br>for each PUF Core $p_i \in \mathcal{P}$ do<br>　Run Algorithm 3: Enrollment, Publicize $p_i^{pub}$<br>end for<br>Run (2, 2)-PUF-DKG Protocol, Publicize $\mathcal{P}^{pub}$<br>Evaluation Stage<br><br>for each PUF Core $p_i \in \mathcal{P}$ do<br>　Recover share $r_i^{(\tau)} \leftarrow$ PUF-Retrieve$(c_i^{(\tau)}, helper_i^{(\tau)})$<br>　$p_i^{(\mathcal{O})} \leftarrow \mathcal{O}(r_i^{(\tau)})$, PUF core local threshold share<br>　Update share<br>　　　$r_i^{(\tau+1)} \leftarrow$ PUF-Share-Update$(r_i^{(\tau)})$<br>　Store $r_i^{(\tau+1)}$ and update PUF challenge:<br>　　　$\{c_i^{(\tau+1)}, helper_i^{(\tau+1)}\} \leftarrow$ PUF-Store$(r_i^{(\tau+1)})$<br>end for<br>return $\mathcal{O} \leftarrow$ Combine$(\{p_i^{(\mathcal{O})}, p_j^{(\mathcal{O})}\})$ |

Referring for example to a single-PUF embodiment as shown in FIG. 1, share updating may optionally be logically split into a preparation phase (Algorithm 10) and an application phase (Algorithm 11). During preparation, each participant generates its random polynomial and distributes its portion of the update to the other participants. After all participants have broadcast their portions of the share update, the preparation phase is complete. (Broadcasting may be omitted if preparation is applied within a single device such as an FPGA).

| Algorithm 10 PUF-Share-Update-Preparation |
| --- |
| Goal: Prepare update to construct share $r_i^{(\tau+1)}$<br>for all Participants $p_i \in \mathcal{P}$ do<br>　Select random polynomial of degree $(t - 1)$ such that $\delta_i(0) = 0$:<br>　　　$\delta_i(\cdot) = \Delta_1^{(i)} x + \ldots + \Delta_m^{(i)} x^{t-1}$<br>　Compute<br>　　　$\{\epsilon_{im} = \Delta_m^{(i)} \cdot G\}_{m \in [1 \ldots t-1]}$<br>　　　$\{u_{ij} = \delta_i(j)\}_{j \in [1 \ldots n]}$<br>　　　$\{e_{ij} = ENC_j(u_{ij})\}_{j \in [1 \ldots n]}$<br>　Broadcast<br>　　　$VSS_i^{(\tau)} = \langle i, \tau, \{\epsilon_{im}\}, \{e_{ij}\} \rangle,$<br>　　　　$SIG_i(VSS_i^{(\tau)})$<br>end for |

Next, each participant verifies the update information received from other participants and applies the update to its share as set forth in Algorithm 11.

| Algorithm 11 PUF-Share-Update-Application |
| --- |
| Goal: Apply share update to construct $r_i^{(\tau+1)}$<br>for all Participants $p_i \in \mathcal{P}$ do<br>　Recover share $r_i^{(\tau)}$<br>　　　$r_i^{(\tau)} \leftarrow$ PUF-Retrieve$(c_i^{(\tau)}, helper_i^{(\tau)})$<br>　Verify $\forall j \neq i$<br>$$DEC_i(ENC_i(u_{ji})) \cdot G \stackrel{?}{=} \sum_{k=1}^{t} i^k \epsilon_{jk}$$<br>　Update share as:<br>$$r_i^{(\tau+1)} \leftarrow r_i^{(\tau)} + \left(\sum_{j=1}^{n} u_{ji} \bmod q\right)$$<br>end for |

As each threshold operation over a share can be performed independently of the other shares, the device need only recover one share at a time. This process is illustrated in Algorithm 12. Upon receiving a command O and its associated auxiliary information Aux, the device first performs Algorithm 10 to prepare for the share update. Next, the device iteratively performs threshold operations over each share. A share is recovered by reading a challenge-helper pair from non-volatile memory, and using the PUF to regenerate the corresponding share. After performing a threshold operation over the share, the share update is applied using Algorithm 11, which generates the updated share for new time period $(\tau+1)$. After computing the threshold operations over each share, the threshold operations are combined to form the result O which is returned to the server.

| Algorithm 12 PUF-Threshold-OP-Staggered |
| --- |
| Goal: Perform threshold operation $\mathcal{O}$<br>Assume: PUF-DKG (Algorithm 4) has been executed by PUF Device d<br>for Server s do<br>　Issue Command $\mathcal{O}$ and Auxiliary Information Aux<br>end for<br>for PUF Device d do |

Algorithm 12 PUF-Threshold-OP-Staggered for each share $r_i$ do
   PUF-Share-Update-Preparation
end for
for each challenge $c_i$ (Challenge $c = c_0\| \ldots \|c_n$) do
   Read challenge $c_i$ and helper data $h_i$
   Recover share $r_i \leftarrow$ PUF-Retrieve($c_i, h_i$)
   Perform threshold operation $\mathcal{O}$ ($r_i$, Aux)
   Update share
               $r_i^{(\tau+1)} \leftarrow$ PUF-Share-Update-Application($r_i^{(\tau)}$)
   Store $r_i^{(\tau+1)}$ and update PUF challenge:
               $\{c_i^{(\tau+1)}, \text{helper}_i^{(\tau+1)}\} \leftarrow$ PUF-Store($r_i^{(\tau+1)}$)
end for
Combine threshold operations $\mathcal{O} \leftarrow$ Combine($\{\mathcal{O}$ ($r_i$, Aux)$\}_{0 \leq i \leq n}$)
return Result $\mathcal{O}$
end for
for Server s do
   Process operation $\mathcal{O}$
end for In one embodiment, a (2, 2) threshold system is constructed internally to the device. Algorithm 13 illustrates an example of a single-PUF (2, 2) threshold construction of the more general Algorithm 12. The device has the share set $\{r_0, r_1\}$, and iteratively computes a threshold operation over each share to produce the set $\{p_0^{(\mathcal{O})}, p_1^{(\mathcal{O})}\}$. Once both threshold operations are complete and the shares have been updated and stored, the two threshold operations are combined into the final output $\mathcal{O}$.

Algorithm 13 Internal-PUF-Threshold-OP-Staggered

Goal: Perform threshold operation $\mathcal{O}$ at time $\tau$
One-Time Setup Stage for each Threshold Share $r_i$ do
   Run Algorithm 3: Enrollment, Publicize $p_i^{pub}$
end for
Run (2, 2)-PUF-DKG Protocol, Publicize $\mathcal{P}^{pub}$
Evaluation Stage for each Threshold Share $r_i$ do
   PUF-Share-Update-Preparation
end for
for each Threshold Share $r_i$ do
   Recover share $r_i^{(\tau)} \leftarrow$ PUF-Retrieve($c_i^{(\tau)}$, helper$_i^{(\tau)}$)
   $p_i^{(\mathcal{O})} \leftarrow \mathcal{O}$ ($r_i^{(\tau)}$), Local threshold operation
   Update share
               $r_i^{(\tau+1)} \leftarrow$ PUF-Share-Update-Application($r_i^{(\tau)}$)
   Store $r_i^{(\tau+1)}$ and update PUF challenge:
               $\{c_i^{(\tau+1)}, \text{helper}_i^{(\tau+1)}\} \leftarrow$ PUF-Store($r_i^{(\tau+1)}$)
end for
return $\mathcal{O} \leftarrow$ Combine($\{p_0^{(\mathcal{O})}, p_1^{(\mathcal{O})}\}$)

Figure 5:
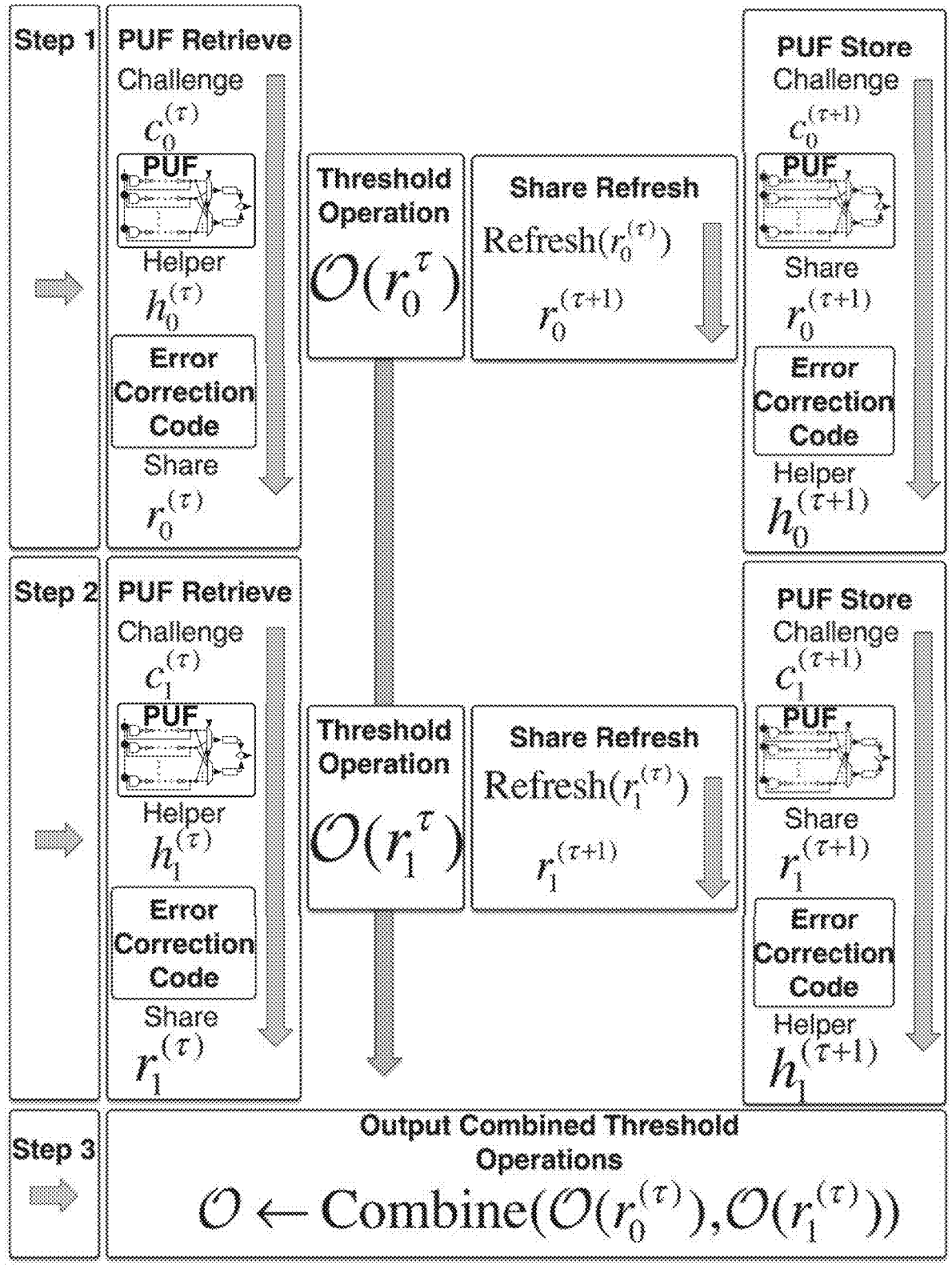
FIG. 5 is an operational flowchart of the staggered threshold cryptographic operations in a device like that of FIG. 1 in an embodiment of the invention.

The flow of Algorithm 13, a specific single-PUF (2, 2) threshold construction of the more general Algorithm 12, is illustrated in FIG. 5. Prior to Step 1, the share update preparation (Algorithm 10) is performed. In Step 1, the first share $r_0^{\tau}$ is retrieved and its corresponding local threshold operation is performed. The share update (Algorithm 11) is then applied to $r_0^{\tau}$ to yield $r_0^{(\tau+1)}$ for the next time period. The updated share is then stored using a new random challenge $c_0^{(\tau+1)}$ which generates the corresponding helper data $h_0^{(\tau+1)}$ which will allow the updated share to be recovered using the PUF. The same process is followed in Step 2 for share $r_1^{\tau}$. Finally, the combined output $\mathcal{O}$ is constructed by combining the two local threshold operations that were performed over each share.

The device has a constant identity $\langle \mathcal{P}^{pub}, \mathcal{P}^{priv} \rangle$, yet all operations $\mathcal{O}$ that require $\mathcal{P}^{priv}$ are performed without having to reconstruct $\mathcal{P}^{priv}$ and can also be used with values that change after each operation is executed. As each part uses the PUF-Store and PUF-Retrieve algorithms to maintain its share, the (challenge, helper) pair is updated after each operation when PUF-Store is executed. Each share is refreshed for the new time period $\tau+1$, and is stored by generating a new random challenge $c_i^{(\tau+1)}$ and setting the updated helper to helper$_i^{(\tau+1)} \leftarrow$ ECC($r_i^{(\tau+1)}$)$\oplus$PUF($c_i^{(\tau+1)}$). Staggering the threshold operations such that the share regeneration, threshold operation, and share storing occur consecutively (rather than concurrently), precludes the simultaneous recovery of more than one updated share. Any tampering while one share exists would (assuming tampering pushes PUF output beyond error correction limits) prevent recovery of another share, in which case the device cannot perform operations over its private key.

An adversary applying a side channel attack against such an embodiment therefore must extract t or more shares from a period of observation that cannot exceed the period of refreshment. In other words, the adversary must compromise t shares in a given time period $\tau$ since any shares from time period $\tau$ are useless in time period $\tau+1$. The difficulty of a side channel attack thus can be increased by updating more frequently (even after each operation). (Increasing refresh frequency also may multiply the difficulty inherent in side channel attacks on multiple-PUF device embodiments in which a remote adversary must observe and resolve multiple PUF values simultaneously generated in the device).

In addition to asymmetric operations, symmetric cryptographic operations may also be performed in a threshold manner. Thus all cryptographic operations, asymmetric and symmetric, can be performed over threshold shares rather than the private key. As with the refreshing process described for shares of an asymmetric private key, the shares of a symmetric key may also be refreshed.

Dynamic Membership

The dynamic nature of shares in this construct also permits an embodiment in which the number of participants n participating in a group can be varied dynamically so that participants may join or leave the set of participants in the (t, n) threshold system. In this case, up to n t participants can be removed from the set $\mathcal{P}$ simply by leaving them out of the next share refresh protocol. To add a participant $p_j$ to the set of participants, each current participant $p_i$ generates an extra share $u_{ij}$ from their share update polynomial $\delta_i(\bullet)$.

To add a new participant $p_{new}$ with ID new to the set of participants, their share $f(\text{new})$ must be generated by t members with existing shares. This is performed by each of the t members contributing their share interpolated for $p_{new}$, and blinding these sub-shares with a sharing of zero distributed among the t members. The blinding by a sharing of zero prevents recovery of the t shares $r_i$ from the sub-shares. That is, as the t participants are known, distributing a sub-share as $$\left( r_i \cdot \left( \prod_{\substack{j=1 \\ j \neq i}}^{t} \frac{\text{new} - j}{i - j} \right) \right) \bmod q$$

allows the participant $p_{new}$ to remove the Lagrangian interpolation term $$\left( \prod_{\substack{j=1 \\ j \neq i}}^{t} \frac{\text{new} - j}{i - j} \right)$$

and recover $p_i$'s share $r_i$, as the t members that contribute sub-shares are known to $p_{new}$. To prevent $p_{new}$ from recovering an existing share $r_i$ from the sub-share, each sub-share is blinded using separate shares of a sharing of 0 among the t members. Algorithm 14 describes how shares of 0 are generated and distributed to the other existing t members.

---
Algorithm 14 Share-Blinding
---

Goal: Prepare a sharing of 0
for all Participants $p_i \in \mathcal{P}$ do
    Select random polynomial of degree (t − 1) such that $\delta_i(0) = 0$:
$$\delta_i(\cdot) = \Delta_1^{(i)} x + \ldots + \Delta_m^{(i)} x^{t-1}$$
    Compute
$$\{\epsilon_{im} = \Delta_m^{(i)} \cdot G\}_{m \in [1\ldots t-1]}$$
$$\{u_{ij} = \delta_i(j)\}_{j \in [1\ldots t]}$$
$$\{e_{ij} = ENC_j(u_{ij})\}_{j \in [1\ldots t]}$$
    Broadcast
$$VSS_i^{(\tau)} = \langle i, \tau, \{\epsilon_{im}\}, \{e_{ij}\} \rangle,$$
$$SIG_i(VSS_i^{(\tau)})$$
end for First, each participant $p_i \in \mathcal{P}$, $|\mathcal{P}| \geq t$ generates a polynomial $\delta_i(\bullet)$ where the free coefficient $\Delta_0^{(i)}=0$, and consequently $\delta_i(0)=0$. Each participant then distributes shares of their polynomial $\delta_i(j)$ to the other players $p_{j,j \neq i} \in \mathcal{P}$ to complete a verifiable sharing of 0. Thus, these shares can be used to blind another sharing without changing the secret being shared.

Upon receiving the sharing of 0, each participant will verify the shares and use them to blind their sub-shares for new participant $p_{new}$. Algorithm 15 describes how the sharing of 0 is verified, the local sub-share of $p_{new}$'s share is constructed, and how it is blinded before being distributed to $p_{new}$.

---
Algorithm 15 Share-Construction
---

Goal: Enable new participant $p_{new}$ to construct a new share $r_{new}$
for all Participants $p_i \in \mathcal{P}$ do
    Recover share $r_i^{(\tau)}$
$$r_i^{(\tau)} \leftarrow PUF\text{-}Retrieve(c_i^{(\tau)}, helper_i^{(\tau)})$$
    Verify $\forall j \neq i$
$$DEC_i(ENC_i(u_{ji})) \cdot G \stackrel{?}{=} \sum_{k=1}^{t} j^k \epsilon_{jk}$$
    Construct sub-share $r_{new}^i$ for $p_{new}$
$$r_{new}^j \leftarrow \left( r_i^{(\tau)} \cdot \left( \prod_{\substack{j=1 \\ j \neq i}}^{t} \frac{new - j}{i - j} \right) \right) \bmod q$$
    Blind sub-share with sharing of 0 from Algorithm 14: Share-Blinding
$$r_{new}^j \leftarrow r_{new}^j + \sum_{i=1}^{t} \left( u_{ji} \cdot \left( \prod_{\substack{j=1 \\ j \neq i}}^{t} \frac{-j}{i - j} \right) \right) \bmod q$$
    $p_{new} \leftarrow ENC_{p_{new}}(r_{new}^i)$
    Update share
        $r_i^{(\tau+1)} \leftarrow PUF\text{-}Share\text{-}Update\text{-}Application(r_i^{(\tau)})$
    Store $r_i^{(\tau+1)}$ and update PUF challenge:
        $\{c_i^{(\tau+1)}, helper_i^{(\tau+1)}\} \leftarrow PUF\text{-}Store(PUF_i, r_i^{(\tau+1)})$
end for
for New Participant $p_{new}$ do
    for all $i \in \mathcal{P}$ do
        $r_{new}^i \leftarrow DEC_{p_{new}}(ENC_{p_{new}}(r_{new}^i))$ ---
Algorithm 15 Share-Construction
--- end for
    $r_{new}^{(\tau)} = \Sigma_{i=1}^{t} r_{new}^i \bmod q$
    $r_{new}^{(\tau+1)} \leftarrow PUF\text{-}Share\text{-}Update\text{-}Application(r_{new}^{(\tau)})$
    $\{c_{new}^{(\tau+1)}, helper_{new}^{(\tau+1)}\} \leftarrow PUF\text{-}Store(PUF_{new}, r_{new}^{(\tau+1)})$
end for First, each of the t participants $p_i \in \mathcal{P}$ begins by recovering their share $r_i^{(\tau)}$ and verifying the sharing of 0 they received from Algorithm 14. The sub-share $r_{new}^i$ generated by participant $p_i$ is then constructed by performing their portion of Lagrangian interpolation for $f(new)$, where new is the ID of the new participant. This sub-share is subsequently blinded using the sharing of 0 to prevent the new participant $p_{new}$ from recovering the share $r_i$ of participant $p_i$ by removing the Lagrangian interpolation term. After sending their sub-share to $p_{new}$, participant $p_i$ updates their share to the new time period ($\tau$+1) and stores this value using a PUF. All of the received sub-shares are combined by the new participant $p_{new}$ to form their share $r_{new}^{(\tau)}$, which is finally updated for time period ($\tau$+1) and stored using a PUF.

In other embodiments, the players may perform the operations of Algorithm 15 in a different order. For example, first each of the t participants $p_i \in \mathcal{P}$ recover their share $r_i^{(\tau)}$ and verify the sharing of 0 they received from Algorithm 14. Then $p_i$ updates their share to the new time period ($\tau$+1), which is subsequently used to generate the replacement sub-share $r_{new}^i$ by performing their portion of Lagrangian interpolation for $f(new)$, where new is the ID of the new participant. Participant $p_i$ stores their updated share $r_i^{(\tau+1)}$ using the PUF, and sends the sub-share $r_{new}^{(\tau+1)}$ to $p_{new}$. All of the received sub-shares are combined by the new participant $p_{new}$ to form their share $r_{new}^{(\tau+1)}$, which is then stored using a PUF.

Reconfigurable PUFs

The enforcement of invalidation of used challenge-helper pairs in refreshing-share embodiments of the invention may be improved through the application of reconfigurable PUFs ('RPUFs'). In one embodiment, an authenticatable device may be provided with a single reconfigurable PUF e.g., a logically-reconfigurable PUF having a reversible configuration process, and e.g., a (2, 2) threshold sharing employed. The PUF configuration is controlled by a parameter, which may be stored locally on the device. Using parameter a to recover one share, a new random parameter b is chosen, the PUF is reconfigured, and the refreshed share is translated into a challenge-helper pair for storage using the PUF configured with parameter b. The PUF is then reconfigured using parameter a to recover the second share, which is subsequently refreshed and translated into a challenge-helper pair for storage using the PUF configured with parameter b. Now, original PUF parameter a is deleted, and the next round will select a new random parameter c to replace parameter b.

In another embodiment, an authenticatable device can be provided with two reconfigurable PUF circuits (e.g., PUF-A, PUF-B) having a non-reversible reconfiguration process, and a (2, 2) threshold sharing employed. After each share is recovered using PUF-A and refreshed, it is translated into a challenge-helper pair for storage using PUF-B. Once both refreshed shares have been stored using PUF-B, the reconfiguration process is applied to PUF-A, such that PUF-A now exhibits a new PUF mapping. The next time the shares are recovered, the same procedure is performed using PUF-B for recovery and PUF-A for commitment.

Figure 6:
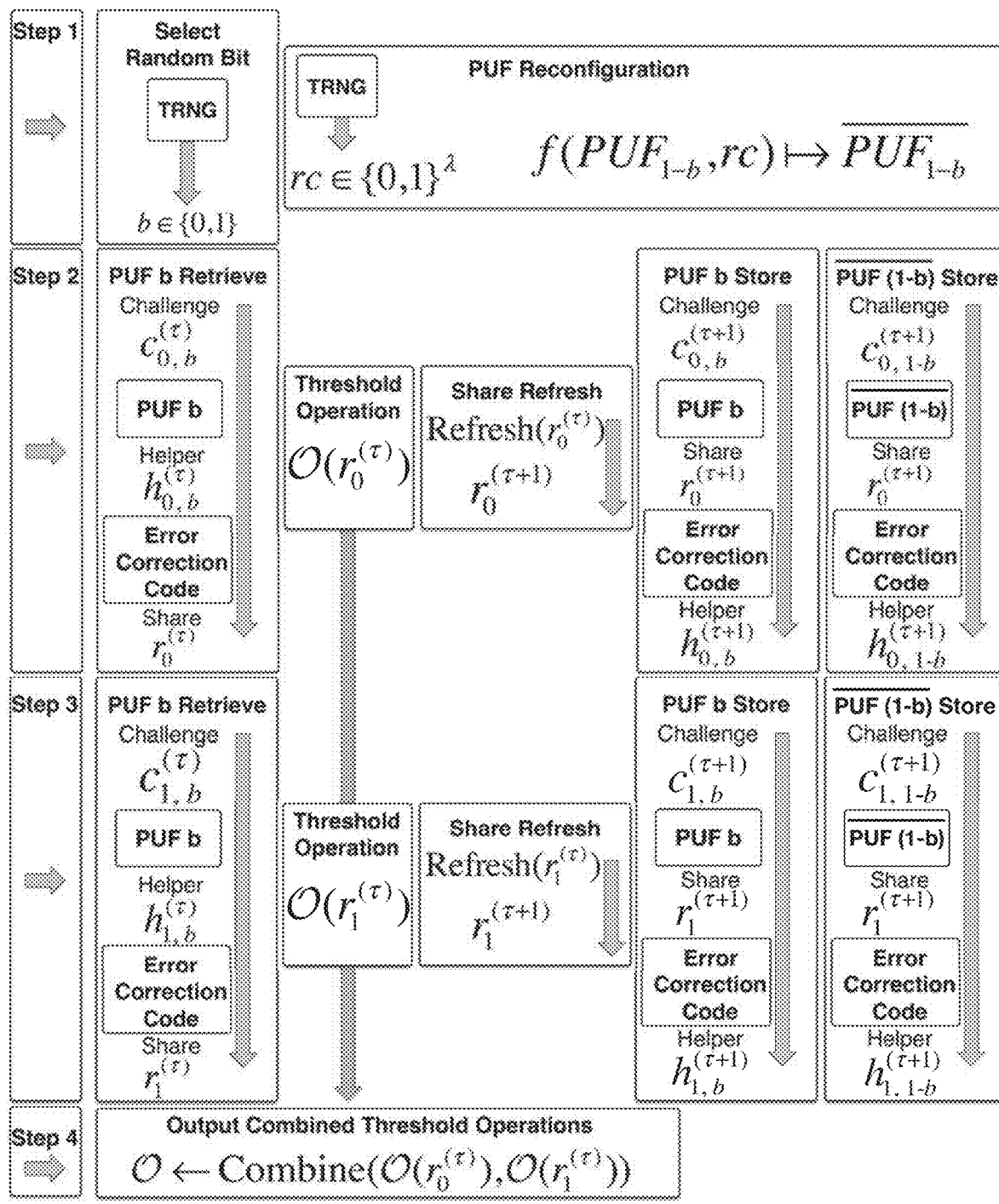
FIG. 6 is an operational flowchart of threshold cryptographic operations in a device having redundant reconfigurable PUFs.

With reference to FIG. 6, in still another embodiment, an authenticatable device can be provided with a pair of redundant RPUFs (which are preferably irreversibly reconfigurable, such as physically-reconfigurable PUFs) and be configured such that one of the RPUFs ($PUF_{1-b}$, $b \in \{0, 1\}$) is randomly selected upon power-up for reconfiguration while the other RPUF's mapping remains unchanged and is used to recover shares from the device's stored challenge-helper values. Parameterizing the preceding PUF-Store and PUF-Retrieve algorithms, Algorithms 16 and 17 now use a specific $PUF_b$ to store or retrieve, respectively, a value $V_i$.

---
Algorithm 16 PUF-Store
---

Goal: Store value $V_i$
for PUF Device d do
    Select finite field $\mathbb{F}_n$ of order n
    Select E, an elliptic curve over $\mathbb{F}_n$
    Find $G \in E/\mathbb{F}_n$, a group generator
    for PUF b do
        Select challenge $c_{i,b} \in \mathbb{F}_n$ uniformly at random
        $x = H(c_{i,b}, E, G, n)$
        $O = PUF_b(x)$
        $helper_{i,b} = P_{i,b} = O \oplus ECC(V_i)$
        Write $\{c_{i,b}, helper_{i,b}\}$ to non-volatile memory
    end for
end for ---
Algorithm 17 PUF-Retrieve
---

Goal: Retrieve value $V_i$
for PUF Device d do
    for PUF b do
        Read $\{c_{i,b}, helper_{i,b}\}$ from non-volatile memory
        $x \leftarrow H(c_{i,b}, E, G, n)$
        $O' = PUF_b(x)$
        $V_i \leftarrow D((ECC(V_i) \oplus O) \oplus O')$
    end for
end for Referring again to FIG. 6, at Step 1 the device is powered on and, preferably a source of randomness is used—for example, a true random number generator ('TRNG'; e.g., FPGA-based such as described in Mazjoobi, "FPGA-based True Random Number Generation using Circuit Metastability with Adaptive Feedback Control," International Workshop on Cryptographic Hardware and Embedded Systems, Springer Berlin Heidelberg (2011); or IC-based such as FDK Corporation's RPG100 or an ASIC incorporating similar circuitry)—to select a bit $b \in \{0, 1\}$ uniformly at random. This bit is used to select $PUF_b \in \{PUF_0, PUF_1\}$ for reconfiguration. Then, preferably a source of randomness such as a TRNG is utilized to generate an ephemeral reconfiguration string $rc \in \{0, 1\}^\lambda$, where $\lambda$ is the security parameter of the system. The PUF reconfiguration function $f(PUF_{1-b}, rc) \to \overline{PUF_{1-b}}$ is applied to $PUF_{1-b}$ using reconfiguration string rc to result in a new $\overline{PUF_{1-b}}$ mapping, where responses for a fixed challenge c input to $PUF_{1-b}$ and $\overline{PUF_{1-b}}$ will yield responses t-distant, where t is the error correcting code threshold. Thus, the putative correlated response resulting from the challenge to $\overline{PUF_{1-b}}$ is not usably correlated to the share due to its reconfiguration from previous state $PUF_{1-b}$. This step need only occur on device power-on, as the current challenge-helper pairs can be maintained in volatile memory (which is preferably protected by the tamper sensitivity of the PUF), and written to non-volatile memory to ensure state recovery in the event of loss of power. That is, once powered on and Step 1 completes, the device need not read the challenge-helper pairs from non-volatile memory, only writing to ensure state recovery in the event of power loss.

As $\overline{PUF_{1-b}}$ has been reconfigured, the challenge-helper pairs $\{c_{i,1-b}^{(\tau)}, h_{i,1-b}^{(\tau)}\}$ generated using the unmodified $PUF_{1-b}$ will no longer recover the shares, as the PUF reconfiguration function $f(\cdot)$ outputs a new PUF configuration that is t-distant from its argument. Thus, share recovery is performed using $PUF_b$, which remains unmodified (FIG. 6 Steps 2-3) and thus its putative responses remain usably correlated to the shares. After the shares $r_i^{(\tau)}$ have been refreshed to their new representations $r_i^{(\tau+1)}$, a challenge-helper pair is preferably generated using both $PUF_b$ and $\overline{PUF_{1-b}}$, so that if the device is power-cycled, the shares can be recovered using whichever PUF is not selected for reconfiguration. Finally, the intermediate threshold operations over each share $\mathcal{O}(r_i^\tau)$ are combined into the final cryptographic output $\mathcal{O}$ (FIG. 6 Step 4). The boot/reconfiguration operations outlined in FIG. 6 are set forth in pseudocode in Algorithm 18.

---
Algorithm 18 Reconfig-Boot
---

Goal: Perform threshold operation $\mathcal{O}$
Assume: PUF-DKG has been executed by PUF Device d
for Server s do
    Issue Command $\mathcal{O}$ and Auxiliary Information Aux
end for
for Device d do
    Power On
    $b \in \{0, 1\} \leftarrow$ TRNG
    $rc \in \{0, 1\}^\lambda \leftarrow$ TRNG
    $\overline{PUF_{1-b}} \leftarrow reconfig(PUF_{1-b}, rc)$
    for each share $r_i^{(\tau)}$ do
        PUF-Share-Update-Preparation
    end for
    for each challenge $c_{i,b}^{(\tau)}$ (Challenge $c = c_{0,b}^{(\tau)} \| \ldots \| c_{n,b}^{(\tau)}$) do
        Read challenge $c_{i,b}^{(\tau)}$ and helper data $h_{i,b}^{(\tau)}$
        Recover share $r_i^{(\tau)} \leftarrow$ PUF-Retrieve($PUF_b, c_{i,b}^{(\tau)}, h_{i,b}^{(\tau)}$)
        Perform threshold operation $\mathcal{O}(r_i^{(\tau)}, Aux)$
        Update share
            $r_i^{(\tau+1)} \leftarrow$ PUF-Share-Update-Application($r_i^{(\tau)}$)
        Store $r_i^{(\tau+1)}$ and update PUF challenge:
            $\{c_{i,b}^{(\tau+1)}, helper_{i,b}^{(\tau+1)}\} \leftarrow$ PUF-Store($PUF_b, r_i^{(\tau+1)}$)
            $\{c_{i,1-b}^{(\tau+1)}, helper_{i,1-b}^{(\tau+1)}\} \leftarrow$ PUF-Store($\overline{PUF_{1-b}}, r_i^{(\tau+1)}$)
    end for
    Combine threshold operations $\mathcal{O} \leftarrow$ Combine($\{\mathcal{O}(r_i^{(\tau)}, Aux)\}_{0 \leq i \leq n}$)
    return Result $\mathcal{O}$
end for
for Server s do
    Process operation $\mathcal{O}$
end for The TRNG and variables not stored in non-volatile memory are preferably protected by the tamper sensitivity property of the PUF, so that an adversary cannot bias the TRNG or alter the bit b selected on power-on. In that regard, reconfigurable PUFs have been demonstrated as a viable protection mechanism for non-volatile memory (see, e.g., Kursawe et al., "Reconfigurable Physical Unclonable Functions Enabling technology for tamper-resistant storage.").

It is noted that if the device of the foregoing embodiment loses power before storing in memory updated challenge-helper pairs using both the unmodified and reconfigured PUF, when it is powered up the unmodified PUF may be selected for reconfiguration and the shares will be unrecoverable. In an embodiment configured to preclude that possibility, a pair of backup PUFs may be employed, with a set of corresponding challenge-helper pairs generated for each of the backup PUFs. If the primary pair of PUFs are unable to regenerate the shares (e.g., the device performs a test by comparing its regenerated public key against the original stored in non-volatile memory), the backup pair can be invoked. The same general approach that is used for the primary PUF pair can be followed, where the device randomly reconfigures one of the backup PUFs before attempting share regeneration.

More specifically, on power-up, the device proceeds as in FIG. 6 Step 1. After regenerating the shares (which may be incorrect if both primary PUFs have been reconfigured) the device regenerates its putative public key and compares it against a copy stored in non-volatile memory (generated during the original distributed key generation process). If the putative regenerated public key and the stored public key differ (indicating the share recovery may have failed due to a benign power-cycle event that resulted in the reconfiguration of both primary PUFs), the device initiates the backup protocol and invokes the backup PUF pair. The TRNG selects a bit $b \in \{0, 1\}$ uniformly at random. This bit is used to select backup $PUF_b \in \{PUF_0, PUF_1\}$ for reconfiguration. The TRNG is queried for an ephemeral reconfiguration string $rc \in \{0, 1\}^\lambda$, where $\lambda$ is the security parameter of the system. The PUF reconfiguration function $f(PUF_{1-b}, rc) \to \overline{PUF_{1-b}}$ is applied to backup $PUF_{1-b}$ using reconfiguration string rc to result in a new $\overline{PUF_{1-b}}$ mapping, where responses for a fixed challenge c input to $PUF_{1-b}$ and $\overline{PUF_{1-b}}$ will yield responses t-distant, where t is the error correcting code threshold.

As backup $\overline{PUF_{1-b}}$ has been reconfigured, the backup challenge-helper pairs $\{c_{i,1-b}^{(\tau)}, h_{i,1-b}^{(\tau)}\}$ generated using the unmodified backup $PUF_{1-b}$ will no longer recover the shares, as the PUF reconfiguration function $f \cdot$ outputs a new PUF configuration that is t-distant from its argument. Thus, share recovery is performed using backup $PUF_b$, which remains unmodified. After the shares $r_i^{(\tau)}$ have been refreshed to their new representations $r_i^{(\tau+1)}$, a challenge-helper pair is generated using both backup $PUF_b$ and backup $PUF_{1-b}$, as well as primary $PUF_b$ and primary $PUF_{1-b}$. This allows the device to return to relying on the primary PUF pair, which were both reconfigured without storing corresponding challenge-helper pairs due to power cycle events. The device has now returned to a state where the primary PUF pair can be successfully invoked on power on, and the backup PUF pair can complete system recovery in the event of a power cycle event that reconfigures both of the primary PUFs. Finally, the intermediate threshold operations over each share $\mathcal{O}(r_i^\tau)$ are combined into the final cryptographic output $\mathcal{O}$.

Physically reconfigurable PUFs (P-RPUFs) can be achieved using phase change memory (PCM), which is a candidate replacement for Flash and DRAM (which itself can be used as a P-RPUF, and, if adopted, would be common to many architectures. A P-RPUF can be instantiated using PCM, and four P-RPUFs can be instantiated on one device by dividing a portion of the memory space into four blocks. Alternately, logically reconfigurable PUFs (L-RPUFs) may be used.

In another embodiment, using a (t, n) sharing in which t<n, one reconfigurable PUF may be allocated per share (rather than allocating any PUF to regenerate all shares). For example, in a (2,4) sharing each of four reconfigurable PUFs would regenerate one of the n=four shares. At power-up, one of the device's PUFs is randomly selected for reconfiguration, resulting in the loss of ability to recover its corresponding share. Upon PUF reconfiguration, however, at least t non-reconfigured PUFs remain to collaborate and help the reconfigured PUF construct a replacement share, as described in Algorithm 19.

---

Algorithm 19 Reconfig-Boot-One-PUF-Per-Share

---

Goal: Reconfigure a PUF and Generate Replacement Share
Assume: PUF-DKG has been executed by PUF Device d
for Device d do
    Power On
    $b \in \{0, 1\}^n \leftarrow$ TRNG
    $rc \in \{0, 1\}^\lambda \leftarrow$ TRNG
    $\overline{PUF_b} \leftarrow$ reconfig($PUF_b$, rc)
    Share-Blinding
    Share-Construction
end for

---

After the selected PUF is reconfigured, the remaining PUFs engage first in Algorithm 14 to construct a sharing of 0, and then engage in Algorithm 15 to construct blinded sub-shares that will enable the reconfigured PUF to construct a replacement share.

Figure 7:
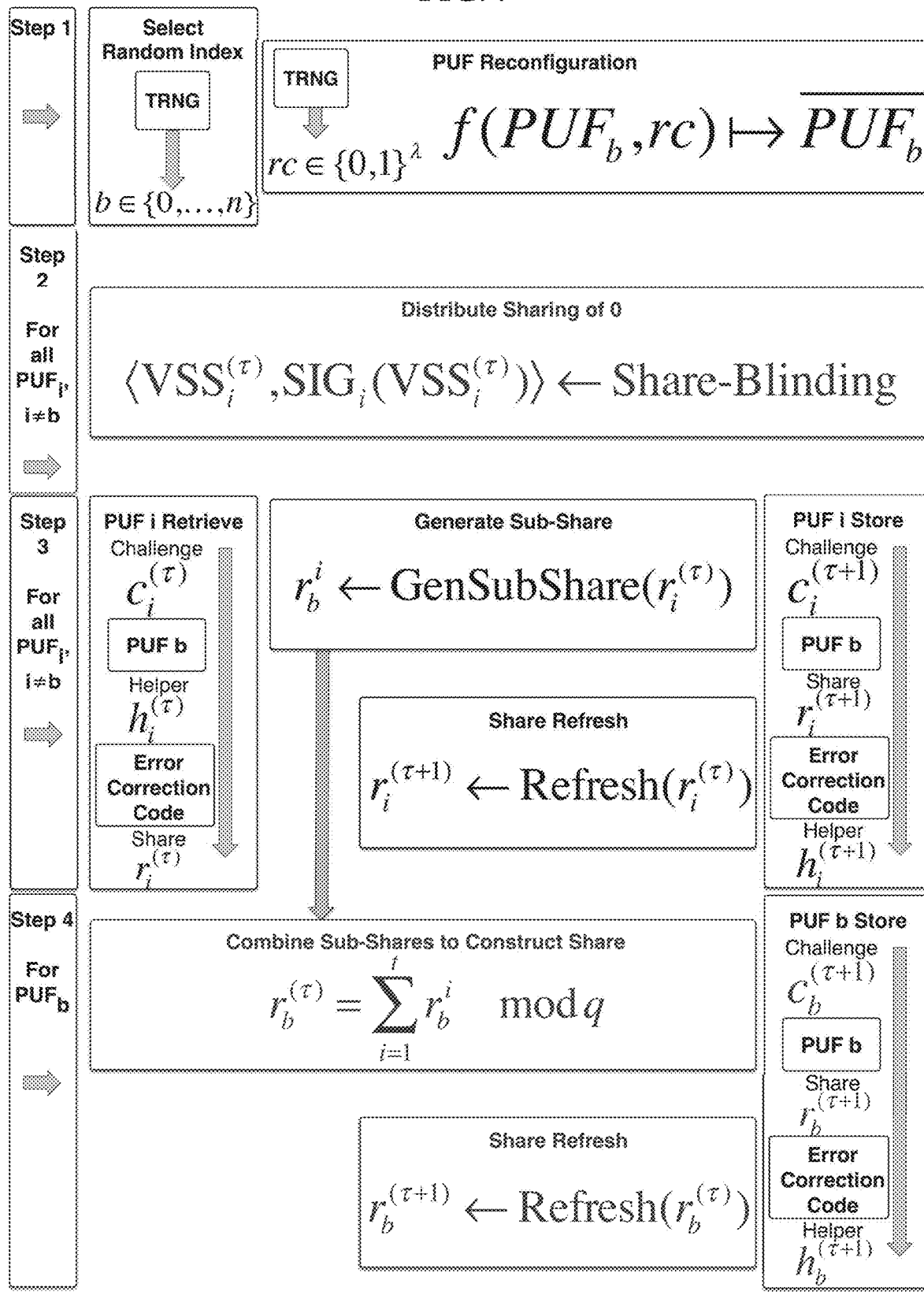
FIG. 7 is an operational flowchart of power-on PUF reconfiguration and replacement share construction in a device using one reconfigurable PUF per share.

This process is illustrated in FIG. 7. Step 1 illustrates the device powering on, preferably randomly selecting a PUF for reconfiguration by choosing a random index $b \in \{0, \ldots, n\}$, and using a random reconfiguration parameter $rc \in \{0, 1\}^\lambda$ to reconfigure $PUF_b$. In Step 2, a set of at least t PUFs engages in Algorithm 14 to construct a verifiable sharing of 0. In Step 3, each of the t PUFs regenerates its corresponding share $r_i^{(\tau)}$ and uses it to generate a sub-share $r_b^i$ for the reconfigured $PUF_b$. This sub-share is blinded using the distributed sharing of 0 performed in Step 2, and the blinded sub-shares are sent to $PUF_b$. Each of the (at least) t shares $r_i^{(\tau)}$ is refreshed for the next time period to $r_i^{(\tau+1)}$ and subsequently stored using the corresponding $PUF_i$. In Step 4, $PUF_b$ combines the sub-shares $r_b^i$ to construct its share $r_b^{(\tau)}$ which is subsequently updated to $r_b^{(\tau+1)}$ for the next time period and stored using the now reconfigured $PUF_i$.

As the device may experience benign or adversary-initiated malicious power failures, more than one PUF may be reconfigured. In one embodiment, the error correcting code used as part of the fuzzy extraction process can provide a method for determining whether a PUF has been reconfigured. If the number of errors identified during decoding exceeds the error correction capability of the helper string, it is likely due to the PUF being reconfigured. In another embodiment, each PUF may store a non-sensitive test value along with its corresponding challenge-helper pair. The device can then issue the challenge to the PUF as part of the test sequence, and if the value recovered using the helper string does not match the stored value, the PUF is deemed to have been reconfigured. (The challenge-helper-value set associated with each PUF should be periodically refreshed, so that benign hardware aging does not cause the device to incorrectly assume the PUF has been reconfigured). In yet another embodiment, a challenge-response pair can be stored by the device for each PUF. The device can then test whether the PUF has been reconfigured by issuing the challenge and evaluating the Hamming distance between the PUF's response and the reference response stored in memory.

Algorithm 19 can be performed on device power-on, for example, in order to enforce the physical invalidation of old challenge-helper pairs and subsequently construct a replacement for the share lost. Once the device is powered on and this algorithm completes, the device enters normal operational mode such as the example described by Algorithm 20.

```
Algorithm 20 One-PUF-Per-Share-Operational

Goal: Perform threshold operation $\mathcal{O}$
Assume: PUF-DKG has been executed by PUF Device d
for Server s do
    Issue Command $\mathcal{O}$ and Auxiliary Information Aux
end for
    for Device d do
        for each share $r_i^{(\tau)}$ do
            PUF-Share-Update-Preparation
        end for
        for all $PUF_i$, $1 \le i \le n$ do
            Read challenge $c_i^{(\tau)}$ and helper data $h_i^{(\tau)}$
            Recover share $r_i^{(\tau)} \leftarrow$ PUF-Retrieve($PUF_i$, $c_i^{(\tau)}$, $h_i^{(\tau)}$)
            Perform threshold operation $\mathcal{O}$ ($r_i^{(\tau)}$, Aux)
            Update share
                    $r_i^{(\tau+1)} \leftarrow$ PUF-Share-Update-Application($r_i^{(\tau)}$)
            Store $r_i^{(\tau+1)}$ and update PUF challenge:
                    $\{c_i^{(\tau+1)}, helper_i^{(\tau+1)}\} \leftarrow$ PUF-Store($PUF_i$, $r_i^{(\tau+1)}$)
        end for
        Combine threshold operations $\mathcal{O} \leftarrow$ Combine($\{\mathcal{O}(r_i^{(\tau)}, Aux)\}_{0 \le i \le n}$)
        return Result $\mathcal{O}$
    end for
for Server s do
    Process operation $\mathcal{O}$
end for
```

Figure 8:
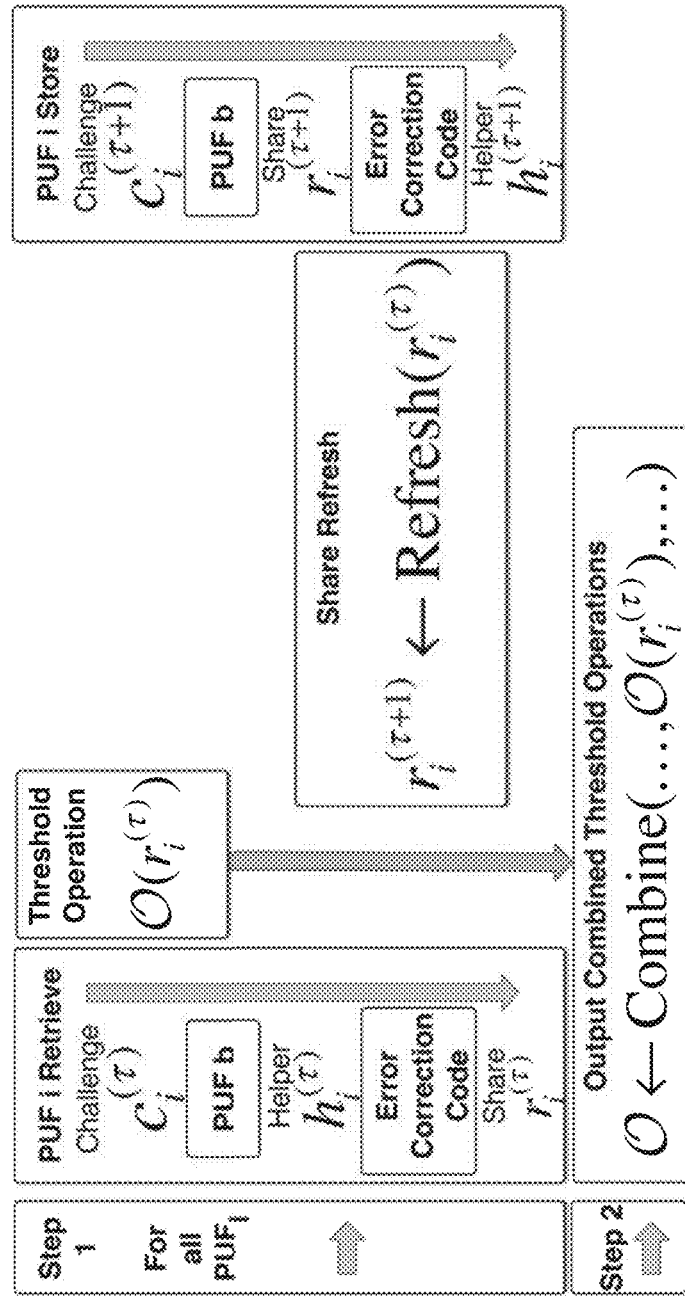
FIG. 8 is an operational flowchart of threshold cryptographic operations in a device using one reconfigurable PUF per share.

FIG. 8 illustrates an implementation of some principles associated with Algorithm 20. In Step 1, each PUF, regenerates its corresponding share $r_i^{(\tau)}$ and performs the threshold operation $\mathcal{O}(r_i^{(\tau)})$. The share is subsequently refreshed for the next time period ($\tau$+1), and stored using $PUF_1$. In Step 2, the individual threshold operations are combined into the final result $\mathcal{O}$.

As with the embodiment of FIG. 6, this embodiment may employ physically or logically reconfigurable PUFs. This embodiment can help reduce the potential for a benign power failure to result in the device being unable to recover t shares in the case where the power failure (and restart) occurs after a power-up PUF reconfiguration but before the construction of a replacement for the share lost to invalidation has completed (see Algorithm 19). For example, a (t, n) sharing wherein n is at least two more than t (e.g., (2, 4)) recovers with Pr=1 from such a power failure; when the device is restarted, regardless of which PUF is reconfigured, at least t valid PUFs will remain available to regenerate the t shares required for correct operation. Two consecutive such power failures with the same timing could be tolerated with Pr=1 if n is at least three greater than t, and so on. The (t, n) embodiment can alternatively be implemented with each RPUF being associated with all shares.

Although certain illustrative embodiments of the invention have been described herein, it will be apparent to those skilled in the art to which the invention pertains that variations and modifications of the described embodiments may be made without departing from the spirit and scope of the invention. For example, separately or in conjunction with the embodiments herein, a (preferably tamper-proof, e.g., encapsulated etc.) capacitor may be employed to provide enough power for the device to carry out all actions following power-up that are required to successfully refresh the device's shares so as to ensure that an adversary cannot power-cycle the device before its shares are refreshed. It is intended that the invention be limited only to the extent required by the appended claims.

What is claimed is:

1. An authenticatable device implementing a threshold sharing of a hardware based identity that comprises a (t, n) threshold sharing of a value, wherein n defines a number of threshold shares of the value and t defines a number of threshold shares needed to recover the value, the authenticatable device comprising:
    a plurality of reconfigurable physical unclonable functions ("RPUFs"), wherein each of at least two of the plurality of RPUFs is associated with at least one respective share of the threshold sharing of the value;
    a memory; and
    at least one processor configured to:
        reconfigure, randomly, one of the at least two RPUFs after power-up of the device, wherein the reconfiguring invalidates a share associated with the reconfigured RPUF; and
        generate, without generating the value in the memory, information derived from at least t valid threshold shares to enable one or more cryptographic operations that require the value.

2. The device of claim 1, wherein the at least one processor is further configured to identify invalid shares.

3. The device of claim 2, wherein the at least one processor is further configured to construct a valid replacement share for the reconfigured RPUF, based on the at least t valid threshold shares.

4. The device of claim 3, wherein the at least one processor is further configured to store a challenge and helper value for the valid replacement share.

5. The device of claim 1, wherein the at least one processor is further configured to enroll the at least two RPUFs in the (t, n) threshold sharing of the value without generating the value in the memory.

6. The device of claim 1, wherein each of the at least two RPUFs is associated with the at least one respective share of the value by an associated challenge and helper pair.

7. The device of claim 6, wherein the threshold sharing is constructed where n-t is at least two.

8. The device of claim 1, wherein the at least one processor is configured to enroll the at least two RPUFs in the (t, n) threshold sharing of the value so t valid shares are required to reconstruct the value, where t is less than n.

9. The device of claim 1, wherein the at least one processor is further configured to trigger a share refresh responsive to enabling a request to execute the one or more cryptographic operations.

10. The device of claim 1, wherein the at least one processor is further configured to execute one or more cryptographic operations that require the value.

11. The device of claim 10, wherein the at least one processor is further configured to generate sub-shares associated with the at least t valid threshold shares and blind the sub-shares.

12. The device of claim 11, wherein the at least one processor is further configured to generate threshold shares of zero values to blind the sub-shares.

13. A computer implemented method for threshold sharing of a hardware based identity comprising a (t, n) threshold sharing of a value on an authentication device, wherein n defines a number of threshold shares of the value and t defines a number of threshold shares needed to recover the value, the method comprising:
    randomly reconfiguring, by at least one processor, one of a plurality of reconfigurable physical unclonable functions ("RPUFs") responsive to power-up of the device, wherein the reconfiguring invalidates a share associated with the reconfigured PUF; and
    generating, by the at least one processor without generating the value in memory, information derived from at least t valid threshold shares to enable one or more cryptographic operations that require the value.

14. The method of claim 13, further comprising identifying, by the at least one processor, invalid shares.

15. The method of claim 14, further comprising constructing, by the at least one processor, a valid replacement share for an invalid share based on the at least t valid threshold shares.

16. The method of claim 15, further comprising storing, by the at least one processor, a challenge and helper pair for the valid replacement share.

17. The method of claim 13, further comprising associating, by the at least one processor, each of at least two of the plurality of the RPUFs with at least one respective share of the value by an associated challenge and helper pair.

18. The method of claim 13, further comprising triggering, by the at least one processor, a share refresh responsive to enabling a request to execute the one or more cryptographic operations.

19. The method of claim 13, further comprising executing, by the at least one processor, one or more cryptographic operations that require the value.

20. A non-transitory computer-readable storage medium storing instructions that, when executed by at least one processor, cause the at least one processor to perform a method for threshold sharing of a hardware based identity comprising a (t, n) threshold sharing of a value on an authentication device, wherein n defines a number of threshold shares of the value and t defines a number of threshold shares needed to recover the value, wherein the method comprises:

randomly reconfiguring, by at least one processor, one of a plurality of reconfigurable physical unclonable functions ("RPUFs") responsive to power-up of the device, wherein the reconfiguring invalidates a share associated with the reconfigured PUF; and generating, by the at least one processor without generating the value in memory, information derived from at least t valid threshold shares to enable one or more cryptographic operations that require the value.

* * * * *